United States Patent
Wu

(10) Patent No.: US 11,774,677 B2
(45) Date of Patent: Oct. 3, 2023

(54) FIBER OPTIC CABLE ASSEMBLY WITH OVERLAPPING BUNDLED STRENGTH MEMBERS, AND FABRICATION METHOD AND APPARATUS

(71) Applicant: CORNING RESEARCH & DEVELOPMENT CORPORATION, Corning, NY (US)

(72) Inventor: Qi Wu, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/747,279

(22) Filed: May 18, 2022

(65) Prior Publication Data

US 2022/0276441 A1    Sep. 1, 2022

Related U.S. Application Data

(62) Division of application No. 16/940,476, filed on Jul. 28, 2020, now Pat. No. 11,360,265.
(Continued)

(51) Int. Cl.
- G02B 6/25 (2006.01)
- G02B 6/255 (2006.01)
- C03C 25/105 (2018.01)

(52) U.S. Cl.
CPC .......... *G02B 6/2558* (2013.01); *C03C 25/105* (2013.01)

(58) Field of Classification Search
CPC ............................ G02B 6/2558; C03C 25/105
See application file for complete search history.

(56) References Cited

U.S. PATENT DOCUMENTS

| 4,018,983 A | 4/1977 | Pedlow |
| 4,077,702 A | 3/1978 | Kunze et al. |

(Continued)

FOREIGN PATENT DOCUMENTS

| CN | 1548492 A | 11/2004 |
| CN | 1735825 A | 2/2006 |

(Continued)

OTHER PUBLICATIONS

Pitt et al., On Modelling the Statistical Strength of Yarns and Cables Under Localized Load-Sharing Among Fibers, Textile Research Journal, 1981, p. 408 (Year: 1981).*

(Continued)

*Primary Examiner* — Peter Radkowski

(57) ABSTRACT

A fiber optic cable assembly includes first and second cable sections each having a jacket, at least one optical fiber, and multiple strength members. An intermediate cable section includes at least one splice joint as well as bundled sections of strength members of the cable sections formed into bundled sections that overlap and are adhered together. As adhered, the bundled strength members are shorter than the at least one spliced optical fiber in the intermediate section to ensure that the strength members bear tensile loads. A fabrication method includes binding unjacketed segments of strength members of two cable sections into bundled sections of strength members, fusion splicing ends of optical fibers, polymerically overcoating at least one splice joint, and adhering the bundled sections of strength members in an overlapping arrangement. An apparatus for thermoplastically coating cable assembly portions includes a trough for molten thermoplastic material, and a lateral insertion slot defined therein.

17 Claims, 14 Drawing Sheets

Related U.S. Application Data

(60) Provisional application No. 62/880,757, filed on Jul. 31, 2019.

(56) References Cited

U.S. PATENT DOCUMENTS

| | | |
|---|---|---|
| 4,254,865 A | 3/1981 | Pacey et al. |
| 4,509,820 A | 4/1985 | Murata et al. |
| 4,537,468 A | 8/1985 | Degoix et al. |
| 4,714,316 A | 12/1987 | Moore et al. |
| 4,778,242 A | 10/1988 | Ota et al. |
| 4,786,138 A | 11/1988 | Buckley |
| 4,812,010 A | 3/1989 | Osaka et al. |
| 4,846,545 A * | 7/1989 | Estabrook ............ G02B 6/4476 385/99 |
| 4,865,411 A | 9/1989 | Darsey et al. |
| 4,878,732 A | 11/1989 | Rohner et al. |
| 4,923,274 A | 5/1990 | Dean |
| 5,022,735 A | 6/1991 | Dahlgren |
| 5,093,048 A | 3/1992 | Kagan |
| 5,201,019 A * | 4/1993 | Gallusser ............ G02B 6/3801 385/136 |
| 5,212,756 A | 5/1993 | Eoll |
| 5,231,688 A | 7/1993 | Zimmer |
| 5,247,598 A | 9/1993 | Takimoto et al. |
| 5,360,464 A | 11/1994 | Yamauchi et al. |
| 5,367,591 A | 11/1994 | Seike et al. |
| 5,416,873 A | 5/1995 | Huebscher et al. |
| 5,477,507 A | 12/1995 | Kaplan |
| 5,682,454 A | 10/1997 | Gaillard |
| 5,720,908 A | 2/1998 | Gaillard |
| 5,731,051 A | 3/1998 | Fahey et al. |
| 5,832,162 A | 11/1998 | Sarbell |
| 6,099,170 A | 8/2000 | Sarbell |
| 6,152,611 A | 11/2000 | Mardirossian et al. |
| 6,282,353 B1 | 8/2001 | Clark |
| 6,295,400 B1 | 9/2001 | Shahid |
| 6,360,044 B1 | 3/2002 | Mills et al. |
| 6,367,990 B1 | 4/2002 | Dumitriu |
| 6,421,493 B1 | 7/2002 | Burek et al. |
| 6,454,471 B1 | 9/2002 | Ware et al. |
| 6,485,199 B1 | 11/2002 | Ware et al. |
| 6,614,971 B2 | 9/2003 | Sun et al. |
| 6,676,299 B1 | 1/2004 | Durrant et al. |
| 6,728,451 B2 | 4/2004 | Kordahi |
| 6,738,555 B1 | 5/2004 | Cooke et al. |
| 6,742,705 B1 | 6/2004 | Clark |
| 6,771,961 B2 | 8/2004 | Bamburak et al. |
| 6,869,227 B2 | 3/2005 | Del et al. |
| 7,118,035 B2 | 10/2006 | Clark |
| 7,181,111 B2 | 2/2007 | Ahrens |
| 7,313,303 B2 * | 12/2007 | Cecchi ................ H02G 1/14 385/103 |
| 7,364,375 B1 | 4/2008 | Jones |
| 7,461,981 B2 | 12/2008 | Yow et al. |
| 7,510,339 B2 * | 3/2009 | Burwell .............. G02B 6/2558 385/95 |
| 7,729,584 B2 * | 6/2010 | Cody .................. G02B 6/4475 385/114 |
| 7,901,147 B1 | 3/2011 | De et al. |
| 7,903,925 B2 | 3/2011 | Cooke et al. |
| 8,047,726 B2 | 11/2011 | Tamekuni et al. |
| 8,096,712 B2 | 1/2012 | Solomon et al. |
| 8,388,242 B2 | 3/2013 | Kachmar et al. |
| 8,408,811 B2 | 4/2013 | De et al. |
| 8,408,818 B2 | 4/2013 | Homma |
| 8,548,294 B2 | 10/2013 | Toge et al. |
| 8,573,855 B2 | 11/2013 | Nhep |
| 8,678,670 B2 | 3/2014 | Takahashi et al. |
| 8,696,221 B2 | 4/2014 | Vastmans et al. |
| 8,702,326 B2 | 4/2014 | Faulkner et al. |
| 8,740,479 B2 | 6/2014 | Shitama et al. |
| 8,824,841 B1 | 9/2014 | Mullen |
| 8,915,659 B2 | 12/2014 | Marcouiller et al. |
| 8,944,411 B2 | 2/2015 | Cooke et al. |
| 8,958,673 B2 | 2/2015 | Cline et al. |
| 9,063,286 B2 * | 6/2015 | Durrant ............... G02B 6/2558 |
| 9,089,931 B1 | 7/2015 | Carberry et al. |
| 9,167,626 B1 | 10/2015 | Wu |
| 9,360,624 B2 | 6/2016 | Faulkner et al. |
| 9,389,382 B2 | 7/2016 | Blazer et al. |
| 9,604,261 B2 | 3/2017 | Wu |
| 9,823,433 B2 * | 11/2017 | Segsworth ........... G02B 6/2558 |
| 9,857,548 B2 | 1/2018 | Nielsen et al. |
| 9,933,572 B2 | 4/2018 | Akiyama et al. |
| 9,939,599 B2 | 4/2018 | Blazer et al. |
| 10,018,782 B2 | 7/2018 | Wu |
| 10,185,110 B2 | 1/2019 | Kaneko et al. |
| 10,209,447 B2 | 2/2019 | Filipowicz et al. |
| 10,254,500 B2 | 4/2019 | Lu et al. |
| 10,353,154 B2 | 7/2019 | Ott et al. |
| 10,658,790 B2 | 5/2020 | Finona |
| RE48,144 E | 8/2020 | Faulkner et al. |
| 10,845,540 B2 * | 11/2020 | Wang .................. G02B 6/2558 |
| 10,976,492 B2 | 4/2021 | Wu |
| 2002/0003934 A1 | 1/2002 | Clark |
| 2003/0016923 A1 | 1/2003 | Summers et al. |
| 2003/0103743 A1 | 6/2003 | Sun et al. |
| 2004/0062480 A1 | 4/2004 | Cronk et al. |
| 2004/0218891 A1 | 11/2004 | Clark |
| 2005/0238313 A1 | 10/2005 | Clark |
| 2005/0271338 A1 | 12/2005 | Livingston |
| 2006/0093281 A1 | 5/2006 | Kesler |
| 2006/0127013 A1 * | 6/2006 | Cecchi ................. H02G 1/14 385/103 |
| 2009/0034917 A1 * | 2/2009 | Burwell ............... G02B 6/2558 385/95 |
| 2009/0103870 A1 | 4/2009 | Solomon et al. |
| 2010/0080522 A1 * | 4/2010 | Cody .................. G02B 6/4475 65/407 |
| 2011/0110635 A1 | 5/2011 | Toge et al. |
| 2011/0311185 A1 | 12/2011 | Kachmar et al. |
| 2012/0020630 A1 * | 1/2012 | Vastmans ............. G02B 6/2558 29/869 |
| 2012/0243838 A1 | 9/2012 | Sato et al. |
| 2012/0281951 A1 | 11/2012 | Takahashi et al. |
| 2013/0074303 A1 * | 3/2013 | Durrant ............... G02B 6/2558 29/402.14 |
| 2013/0251317 A1 | 9/2013 | Faulkner et al. |
| 2013/0302003 A1 | 11/2013 | Bookbinder et al. |
| 2014/0286615 A1 | 9/2014 | Faulkner et al. |
| 2014/0321813 A1 | 10/2014 | Lu |
| 2015/0110450 A1 | 4/2015 | Jones et al. |
| 2015/0253503 A1 | 9/2015 | Saito et al. |
| 2015/0346445 A1 | 12/2015 | Blazer et al. |
| 2016/0116683 A1 | 4/2016 | Murashima et al. |
| 2016/0161672 A1 | 6/2016 | Bauco et al. |
| 2016/0299306 A1 | 10/2016 | Mcalpine et al. |
| 2016/0299310 A1 | 10/2016 | Kaneko et al. |
| 2016/0340485 A1 * | 11/2016 | Nomura ................ C08L 63/00 |
| 2016/0349453 A1 | 12/2016 | Wu |
| 2017/0001224 A1 | 1/2017 | Wu |
| 2017/0010433 A1 | 1/2017 | Nielsen et al. |
| 2017/0031121 A1 | 2/2017 | Blazer et al. |
| 2017/0038551 A1 * | 2/2017 | Segsworth ........... G02B 6/4427 |
| 2018/0011262 A1 | 1/2018 | Chabot et al. |
| 2018/0024294 A1 * | 1/2018 | Wang .................. G02B 6/2558 385/78 |
| 2018/0210152 A1 | 7/2018 | Giotto et al. |
| 2018/0351292 A1 | 12/2018 | Finona |
| 2019/0137689 A1 | 5/2019 | Filipowicz et al. |
| 2020/0012047 A1 | 1/2020 | Wu |
| 2020/0012054 A1 | 1/2020 | Ott et al. |
| 2020/0081186 A1 | 3/2020 | Wu |
| 2021/0103097 A1 * | 4/2021 | Wang .................. G02B 6/2558 |
| 2021/0302656 A1 | 9/2021 | Wu |

FOREIGN PATENT DOCUMENTS

| | | |
|---|---|---|
| CN | 202494801 U | 10/2012 |
| DE | 202007013173 U1 | 12/2007 |
| EP | 0057828 A1 | 8/1982 |
| EP | 0278423 A2 | 8/1988 |

(56) References Cited

FOREIGN PATENT DOCUMENTS

| | | |
|---|---|---|
| EP | 0537413 A1 | 4/1993 |
| EP | 1168018 A2 | 1/2002 |
| JP | 55-103513 A | 8/1980 |
| JP | 55-129305 A | 10/1980 |
| JP | 56-022405 A | 3/1981 |
| JP | 58-147707 A | 9/1983 |
| JP | 59-037515 A | 3/1984 |
| JP | 62-015504 A | 1/1987 |
| JP | 05-233859 A | 9/1993 |
| JP | 11-326677 A | 11/1999 |
| JP | 2001-147340 A | 5/2001 |
| JP | 2004-347801 A | 12/2004 |
| JP | 2005-250294 A | 9/2005 |
| JP | 2009-163165 A | 7/2009 |
| JP | 2011-232375 A | 11/2011 |
| JP | 5233859 B2 | 7/2013 |
| WO | 2001/027673 A1 | 4/2001 |
| WO | 2004/040347 A1 | 5/2004 |
| WO | 2009/040271 A2 | 4/2009 |
| WO | 2011/112764 A1 | 9/2011 |
| WO | 2013/007969 A2 | 1/2013 |
| WO | 2013/126429 A2 | 8/2013 |
| WO | 2018/175122 A1 | 9/2018 |
| WO | 2020/219477 A1 | 10/2020 |

OTHER PUBLICATIONS

Qi et al., Assessment of F-III and F-12 aramid fiber/epoxy interfacial adhesions based on fiber bundle specimens, Composites Part A 112 (2018) 549-557 (Year: 2018).*

Tan et al., Characterization and constitutive modeling of aramid fibers at high strain rates, International Journal of Impact Engineering 35 (2008) 1303-1313 (Year: 2008).*

Duke et al; "Benefits of CO2 Laser Heating for High Reliability Fiber Splicing," Proc. SPIE 735, pp. B1-B12, 2016.

Friebele et al; "Method for Recoating Optical Fibres With Polyimide," Electron. Lett, 34, pp. 1249-1250, 1998.

Glaesemann et al; "The Mechanical Reliability of Corning Optical Fiber in Small Bend Scenarios" ; Corning; ISO 9001 Registered; (2007) 8 Pages.

Matsumoto et al; "Design and Characteristics of Reinforcement Method for Fusion Spliced Optical Fiber," J. Lightwave Technol., LT-3, pp. 322-327, 1985.

Serafini.; "Compact and Reliable Protection of Single-Fiber and Ribbon-Fiber Fusion Splices" Proc. SPIE 1973, pp. 306-315 1993.

Trunk et al; "Protection With Heat-Shrinkable Sleeves for Optical Fiber Arc Fusion Splicing," Proc. SPIE 1365, Components for Fiber Optic Applications V, pp. 124-130, 1990.

Volotinen et al; "Effect of Mechanical Stripping and Arc-Fusion On the Strength and Aging of a Spliced Recoated Optical Fiber," Mat. Res. Soc. Symp. Proc. 531, pp. 163-168, 1998.

Wood, "Reliability of Optical Connectors and Splices," Proc. SPIE 2074, pp. 276-287, 1994.

Wu; "Method and Apparatus for Protecting Fusion Spliced Optical Fibers With Thermoplastic Material" Filed as U.S. Appl. No. 62/592,578, filed Nov. 30, 2017; 81 Pages.

Yablon, A.O.; "Optical Fiber Fusion Splicing," Springer, 2005; pp. 161-180.

Yamada et al; "Arc Usion Splicer With Profile Alignment System for High-Strength Low-Loss Optical Submarine Cable," J. Lightwave Technol., LT-4, pp. 1204-1210, 1986.

* cited by examiner

FIBER OPTIC CABLE ASSEMBLY WITH OVERLAPPING BUNDLED STRENGTH MEMBERS, AND FABRICATION METHOD AND APPARATUS

BACKGROUND

This application is a divisional of U.S. application Ser. No. 16/940,476, filed on Jul. 28, 2020, which claims the benefit of priority to U.S. Application No. 62/880,757, filed on Jul. 31, 2019, both applications being incorporated herein by reference.

BACKGROUND

The disclosure relates generally to fiber optic cables incorporating tensile strength members and protected fusion splices, in addition to methods and apparatuses for fabricating such cables.

Optical fibers are useful in a wide variety of applications, including the telecommunications industry for voice, video, and data transmission. In a telecommunications system that uses optical fibers, there are typically many locations where fiber optic cables, which carry the optical fibers, connect to equipment or other fiber optic cables. Fiber optic cables are frequently produced by extruding thermoplastic material (e.g., polyvinylchloride (PVC)) over at least one coated optical fiber.

FIG. 1 is a cross-sectional view of an exemplary coated optical fiber 10 that includes a glass core 12, glass cladding 14 surrounding the glass core 12, and a polymer coating 20 (wherein may include multiple coating layers, such as an inner primary coating layer 16 and an outer secondary coating layer 18) surrounding the glass cladding 14. The inner primary coating layer 16 may be configured to act as a shock absorber to minimize attenuation caused by any micro-bending of the coated optical fiber 10. The outer secondary coating layer 18 may be configured to protect the inner primary coating layer 16 against mechanical damage, and to act as a barrier to lateral forces. The outer diameter of the coated optical fiber 10 may be about 200 μm, about 250 μm, or any other suitable value. Optionally, an ink layer (e.g., having a thickness of about 5 μm) may be arranged over the outer secondary coating layer 18 of the coated optical fiber 10 to color the fiber (e.g., as is commonly used in ribbonized fibers), or a coloring agent may be mixed with the coating material that forms the outer secondary coating layer 18. An additional buffer coating ("buffer"; not shown), may be applied to the coated optical fiber 10 to provide additional protection and allow for easier handling, effectively forming a cable. The buffer may be embodied in a layer of different material applied to the coating 20, thereby forming a "tight buffer" closely surrounding (intimately contacting and conforming to) the coating 20. Alternatively, the buffer may be embodied in a pre-formed tube (also known as a furcation tube or buffer tube) that has an inner diameter larger than the coating 20 and into which the coated optical fiber 10 is inserted, thereby forming a "loose buffer." This additional buffer typically has an outer diameter of about 900 μm.

In this disclosure, the term "optical fiber" (or "fiber") will be used in a generic sense and may encompass bare optical fibers, coated optical fibers, or buffered optical fibers, as well as optical fibers including different sections corresponding to these fiber types, unless it is clear from the context which of the types is intended. "Bare optical fibers" (including "bare glass optical fibers") or "bare sections" are those with no coating present on the fiber cladding. "Coated optical fibers" or "coated sections" include a single or multi-layer coating (typically an acrylic material) surrounding the fiber cladding and have a nominal (i.e., stated) diameter no greater than twice the nominal diameter of the bare optical fiber. "Buffered optical fibers" or "buffered sections" are coated optical fibers with an additional buffer that increases the nominal diameter of the optical fiber to more than twice the nominal diameter of the bare optical fiber, with 900 μm being the most typical nominal diameter. Buffered optical fibers may also be referred to as "buffered cables." Finally, the term "unbuffered optical fibers" refers to optical fibers without a buffer, and therefore may encompass either bare optical fibers or coated optical fibers.

Optical fiber fusion splicing, which is the process by which a permanent, low-loss, high-strength, fused (or welded) joint is formed between two optical fibers, typically involves multiple tasks. First, polymer coatings (e.g., coating layers 16, 18 of FIG. 1) of coated optical fibers (e.g., coated optical fiber 10 of FIG. 1) are stripped to expose glass cladding (e.g., glass cladding 14 of FIG. 1). Next, flat fiber end faces are formed, typically by cleaving exposed glass portions of the fibers. Then the fibers are laterally aligned to each other. The fiber tips must be heated to their softening point and pressed together to form a joint. Checks such as loss estimation and proof testing (to ensure long-term mechanical reliability) may be performed. The completed fusion splice must also be protected from the environment using packaging, which serves to shield fiber surfaces from mechanical degradation (e.g., abrasion) and chemical degradation (e.g., humidity) to ensure that splices exhibit long-term reliability. Optical fibers must typically be able to withstand service temperatures spanning at least a range of from −40° C. to 85° C. without suffering significant mechanical and/or optical performance degradation.

Fusion spliced optical fibers are typically used in modules and enclosures in which virtually no mechanical force is applied to the fiber splices. When used in cable assemblies in which fiber optic cables are subject to bending and tensile loads during installation and possibly during operation, an external housing is typically utilized to contain the splices, and strain relief or strength members of the cables are mechanically coupled to the housing. Typically, strength members consist of aramid yarn (e.g., Kevlar), and can be attached to a housing by a threaded interconnect, a crimp connection, or epoxy adhesive. The presence of a housing with strength members coupled thereto and containing fusion splices invariably increases the size and detrimentally impacts the aesthetics of spliced fiber optic cables.

U.S. Pat. No. 8,696,221 B2 discloses a method for attaching a strain relief member of a first cable to an outer jacket of the second cable using a heat shrink splice protection sleeve configured to protect an optic fiber splice. However, this method has limited utility since a cable jacket is not an ideal strain relief material as it provides limited load bearing capability, and presence of a comparatively large splice protection sleeve is still required.

Heat shrink splice protection sleeves are commonly used as packaging to protect spliced optical fibers. Such a sleeve may include an outer heat shrink tube (typically made of a heat shrinkable material (e.g., a polyolefin) and/or a non-stick material (e.g., polytetrafluoroethylene (PTFE)), an inner thermoplastic tube typically made of a melt flow adhesive material (e.g., ethylene vinyl acetate (EVA)), optionally in combination with a rigid (e.g., stainless steel) rod serving as a splint. When heated in an oven (e.g., associated with a fusion splicing tool), a thermoplastic tube melts and is compressed around the fiber and the rigid rod by the heat shrink tube, forming a hermetic seal around the fusion splice region.

An exemplary heat shrink protection sleeve 30 used to protect a splice joint 32 formed between two coated optical fibers 10A, 10B is schematically illustrated in FIGS. 2A and 2B. The heat shrink protection sleeve 30 includes a generally cylindrical inner tube 34 (e.g., a melt flow adhesive material such as ethylene vinyl acetate (EVA)) and a generally cylindrical outer tube 36 (e.g., a polyolefin and/or PTFE), wherein the outer tube 36 generally surrounds the inner tube 34, and the inner tube 34 defines an interior passage 40. Although not shown, the inner tube 34 may optionally include a rigid rod useable as a splint. The outer tube 36 is required for conventional heat shrink protection sleeves because the melt flow adhesive material (e.g., EVA) has a very high viscosity and a very low softening temperature (e.g., about 100° C.). The more temperature-resistant outer tube 36 is typically considered indispensable, particularly when the splice is intended for operation over a high temperature range of up to about 85° C. In use, the heat shrink protection sleeve 30 is positioned over a fusion spliced section of two optical fibers 10A, 10B. The fusion spliced section includes the splice joint 32 arranged between (stripped) glass cladding segments 14A, 14B of the respective optical fibers 10A, 10B. Upon application of heat (typically within an oven), the inner tube 34 melts around the optical fibers 10A, 10B, the glass cladding segments 14A, 14B, and the splice joint 32. The outer tube 36, which includes a cylindrical outer surface 38, may include some heat shrinking capability to help the adhesive distribute around the fused optical fibers 10A, 10B.

Groups of coated optical fibers (e.g., 4, 8, 12, or 24 optical fibers) may be held together using a matrix material, intermittent inter-fiber binders ("spiderwebs"), or tape to form "optical fiber ribbons" or "ribbonized optical fibers" to facilitate packaging within cables. For example, optical fiber ribbons are widely used in cables for high capacity transmission systems. Some modern cables in large-scale data centers or fiber-to-the-home networks may contain up to 3,456 optical fibers, and cables having even higher optical fiber counts are under development. Optical fibers that form a ribbon are arranged in parallel in a linear (i.e., one-dimensional) array, with each fiber having a different color for ease of identification. FIG. 3 provides a cross-sectional view of a multi-fiber ribbon 42, which includes twelve optical fibers 44A-44L and a matrix 46 encapsulating the optical fibers 44A-44L. The optical fibers 44A-44L are substantially aligned with one another in a generally parallel configuration, preferably with an angular deviation of no more than one degree from true parallel at any position. Although twelve optical fibers 44A-44L are shown in the multi-fiber ribbon 42, it is to be appreciated that any suitable number of multiple fibers (but preferably at least four fibers) may be employed to form optical fiber ribbons suitable for a particular use.

Mass fusion splicing is a high throughput technology for interconnecting a large number of fibers in a ribbon format. First and second segments of up to twelve fibers arranged in a linear array can be fusion spliced simultaneously by mass fusion splicing. Since sequential formation of twelve fusion splices using a traditional single fiber fusion splicing technique is very time consuming, the ability to fusion splice linearly arrayed segments of up to twelve fibers simultaneously enables entire ribbons to be spliced rapidly, thereby improving manufacturing throughput. Mass fusion splicing also allows for potential material savings. It enables migration from common indoor distribution cables with 900 μm fibers to smaller mini-distribution cables with 250 μm or 200 μm fibers, which is more cost-effective.

Heat shrink protection sleeves similar to those outlined above have also been applied to protect optical fiber ribbon splices, which include multiple fusion splices between first and second arrays of parallel optical fibers contained in first and second optical fiber ribbon segments, respectively. In such a context, an integrated strength member typically includes a flat surface to support the fusion spliced fiber arrays, a thermoplastic inner tube is melted around the spliced ribbon cables and the integrated strength member, and a more temperature-resistant outer tube encases the thermoplastic inner tube. The cross section of a typical ribbon splice protector is 4 mm×4.5 mm, and the length is about 40 mm. Such a splice protector is suitable for interfacing with optical fiber ribbons, but not jacketed cables since the cross-sectional width of a ribbon-type splice protector is much larger than that of a jacketed cable.

For end uses requiring smaller cable widths, loose tube cables having a round cross section with an outer diameter of 2 mm or 3 mm are commonly employed. Alternatively, a round cable may include a rollable optical fiber ribbon, such as disclosed in U.S. Pat. No. 9,939,599 B2 (with the content of such patent being incorporated by reference herein). As noted in the foregoing patent, a rollable optical fiber ribbon includes a ribbon body formed over flexible polymeric material such that a plurality of optical fibers are reversibly movable between a position in which the optical fibers are arranged in a one-dimensional array and a position in which the optical fibers are arranged in a curved shape from a cross-sectional view.

Conventional mass fusion splice technology, as well as conventional splice protection technology, only supports one-dimensional arrays of optical fiber splices. For splicing of fibers of small diameter round cables, it is necessary to ribbonize loose tube fibers or arrange rollable optical fiber ribbons in a one-dimensional array to permit mass fusion splicing, and the mass fusion spliced one-dimensional array of fibers is typically protected in a bulky heat shrink sleeve. FIG. 4 illustrates a conventional cable assembly 50 incorporating first and second loose tube-type cables 52A, 52B bearing pre-coated loose optical fibers 54A, 54B, with stripped sections thereof that are mass fusion spliced in a one-dimensional array in a fusion splice region 56 that is protected by a conventional ribbon splice protector 60. The ribbon splice protector 60 includes an outer heat shrink member 64 and an inner thermoplastic member 62 that surrounds the fusion splice region 56 as well as stripped sections (not shown) of the loose optical fibers 54A, 54B. As shown in FIG. 4, the ribbon splice protector 60 has a much larger diameter or width than a diameter or width of each of the loose tube-type cables 52A, 52B. Moreover, the width of each one-dimensional array of optical fibers 54A, 54B proximate to the inner thermoplastic member 62 is also greater than the diameter of each of the first and second loose tube-type cables 52A, 52B. The benefits of small round cables are thus defeated if a cable assembly incorporating small round cables involves a mass fusion splice connection. The size of conventional one-dimensional array splice protection technology limits the practical attainment of higher fiber density in fiber optic modules and cable assemblies.

FIG. 5 shows a segment of a fiber optic cable 68 including an optical fiber 70 and strength members 76 (e.g., aramid yarn) surrounded by a jacket 78. The optical fiber 70 includes a pre-coated portion 72 and a stripped portion 71 from which a coating has been removed, with the stripped portion 71 of the optical fiber 70 having a cleaved end 74 suitable for fusion splicing to another optical fiber (not shown). The configuration shown in FIG. 5 may be obtained by removing the jacket 78 from a portion of the fiber optic cable 68, trimming of the strength members 76 to a length shorter than the portion of the optical fiber 70, stripping a coating from the optical fiber 70 to yield the stripped portion 71, and cleaving the optical fiber 70 to yield the cleaved end 74.

FIG. 6 schematically illustrates a spliced fiber optic cable 80 including a housing 86 filled with epoxy 88 for securing strength members 76A, 76B of two fiber optic cable segments 68A, 68B and protecting a splice region 82 including a splice between optical fiber segments 70A, 70B of the fiber optic cable sections 68A, 68B. Each fiber optic cable section 68A, 68B includes a jacket 78A,78B that contains an optical fiber 70A, 70B and strength members 76A, 76B such as aramid yarn. The strength members 76A, 76B are typically trimmed to a shorter length (relative to ends of the jackets 78A, 78B) than the corresponding optical fibers 70A, 70B. The strength members 76A, 76B are attached to the housing 86 by potting an entire cavity 87 of the housing 86 with epoxy 88. The potting process is cumbersome in that it requires sealing one end of the housing 86, it consumes a large amount of expensive epoxy material, and it requires a long time period to permit the epoxy 88 to be set (i.e., hardened) before the housing 86 and the spliced fiber optic cable 80 can be handled.

In view of the foregoing, a need remains in the art for fiber optic cable assemblies incorporating fusion splices and strength members to address the above-described and other limitations associated with conventional fiber optic cable assemblies, as well as associated fabrication methods and apparatuses.

SUMMARY

Aspects of the present disclosure provide a fiber optic cable assembly including first and second cable sections each having at least one optical fiber and multiple strength members in a jacket, with an intermediate cable section including at least one splice joint connecting the at least one optical fiber of the first and second cable sections, with strength members of the respective cable sections being bundled into bundled sections, and with the bundled sections of the first and section cable sections being adhered to one another in an overlapping manner in the intermediate cable section. Such an arrangement permits mechanical coupling between strength members of the first and second cable sections without requiring a housing cavity filled with epoxy to effectuate such coupling. A method for fabricating a fiber optic cable assembly is also provided. The method including binding strength members of first and second cable sections into respective first and second bundled sections of strength members, fusion splicing ends of at least one optical fiber of each cable section in an intermediate cable section, forming a polymeric overcoating over at least one splice joint resulting from the fusion splicing, and adhering the first and second bundled sections to one another in an overlapping manner in the intermediate cable section. An apparatus for applying a thermoplastic coating over components of a fiber optic cable assembly is additionally provided. The apparatus includes a trough for containing molten thermoplastic material arranged above a heated working surface, with a lateral insertion slot bounded in part by the working surface in fluid communication with the trough cavity. Such an apparatus may be used for applying thermoplastic material over strength members to form bundled sections of strength members, for applying thermoplastic material over fusion splice regions, and for effectuating adhesion between overlapping bundled sections of strength members.

In one embodiment of the disclosure, a fiber optic cable assembly is provided. The fiber optic cable comprises a first cable section including at least one first optical fiber and a plurality of first strength members within a first jacket, and a second cable section including at least one second optical fiber and a plurality of second strength members within a second jacket. The fiber optic cable assembly further comprises and intermediate cable section arranged between the first and second cable sections and including at least one splice joint joining ends of the at least one first optical fiber and the at least one second optical fiber. The intermediate cable assembly further includes a first bundled section of the plurality of first strength members, and a second bundled section of the plurality of second strength members. In the intermediate cable assembly, the first bundled section overlaps with, and is adhered to, the second bundled section.

In accordance with another embodiment of the disclosure, a method for fabricating a fiber optic cable assembly is provided. The method comprises processing a first cable section, including at least one first optical fiber and a plurality of first strength members within a first jacket, to bind an unjacketed segment of the plurality of first strength members into a first bundled section of the plurality of first strength members. The method further comprises processing a second cable section, including at least one second optical fiber and a plurality of second strength members within a second jacket, to bind an unjacketed segment of the plurality of second strength members into a second bundled section of the plurality of second strength members. The method additionally comprises fusion splicing ends of the at least one first optical fiber and the at least one second optical fiber to form at least one splice joint defining a splice region of the fiber optic cable assembly, wherein each of the at least one first optical fiber and the at least one second optical fiber comprises a stripped portion proximate to the at least one splice joint. The method further comprises forming a polymeric overcoating over the at least one splice joint and over the stripped portion of each of the at least one first optical fiber and the at least one second optical fiber. The method further comprises positioning the first bundled section of the plurality of first strength members and the second bundled section of the plurality of second strength members in an overlapping arrangement, and adhering the overlapped first and second bundled sections to one another.

In accordance with another embodiment of the disclosure, an apparatus for applying a thermoplastic coating over components of a fiber optic cable assembly is provided. The apparatus comprises a support member defining a working surface. The apparatus further comprises a trough arranged above the working surface and defining a trough cavity configured to retain a pool of molten thermoplastic material. The trough is bounded by a rear wall, a front wall, side walls, and the working surface, and wherein a lateral insertion slot extends (i) between the working surface and the front wall and (ii) between the working surface and at least portions of the side walls, with the lateral insertion slot being in fluid communication with the trough cavity. The apparatus further comprises a heating element configured to heat at least the working surface to maintain the pool of molten thermoplastic material in a molten state.

Additional features and advantages will be set forth in the detailed description that follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
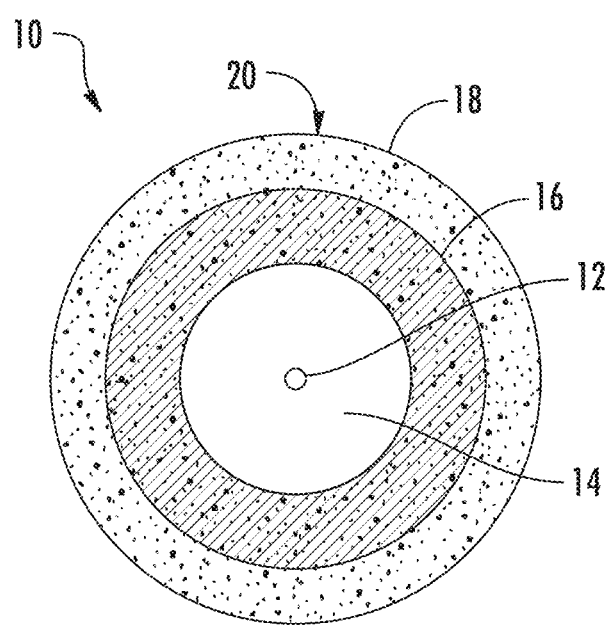
FIG. 1 is a cross-sectional view of a conventional coated optical fiber that may be subject to fusion splicing, prior to stripping of a multi-layer polymer coating from glass cladding.
Figure 2A:
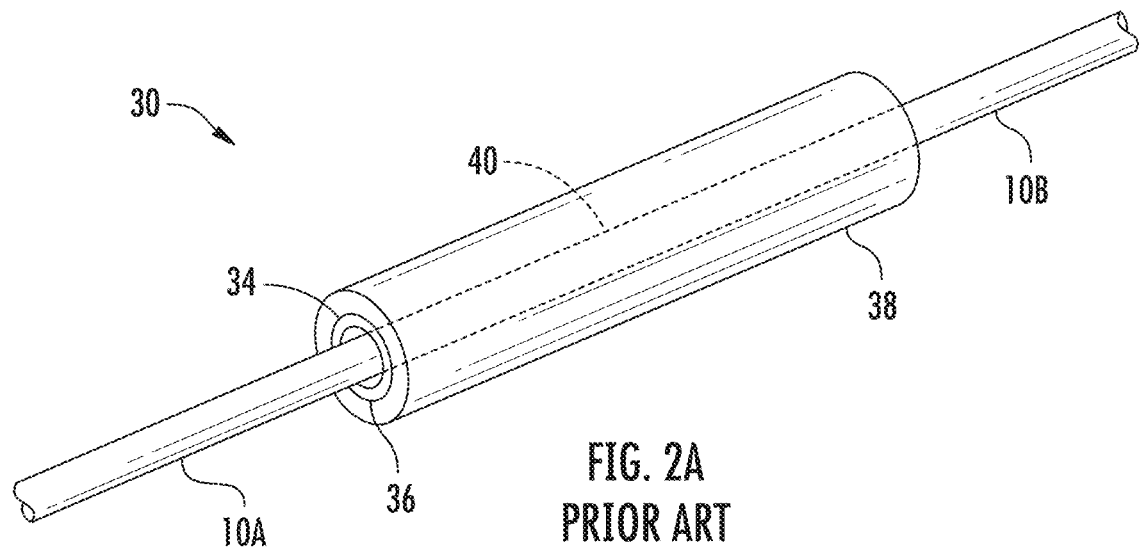
FIG. 2A is a schematic perspective view of a conventional heat shrink protection sleeve used to protect a splice joint between two optical fibers.
Figure 2B:
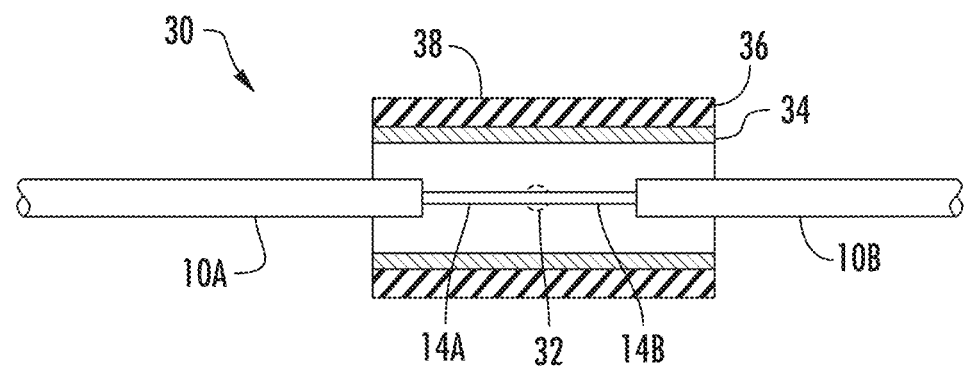
FIG. 2B is a schematic cross-sectional view of the heat shrink protection sleeve and optical fibers of FIG. 2A, with schematic illustration of the splice joint between stripped portions of the two optical fibers.
Figure 3:
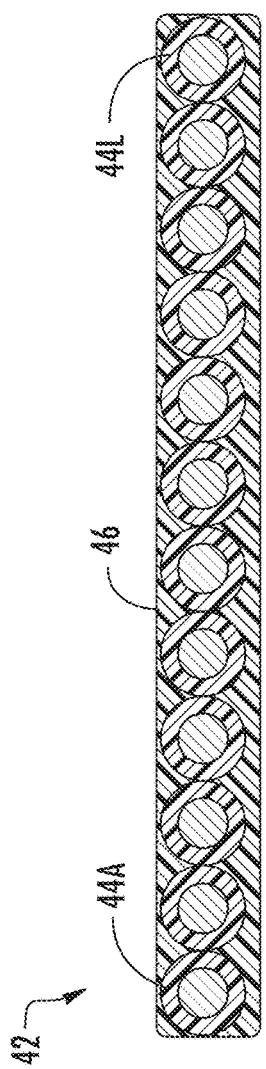
FIG. 3 is a cross-sectional view of a conventional optical fiber ribbon including twelve optical fibers.
Figure 4:
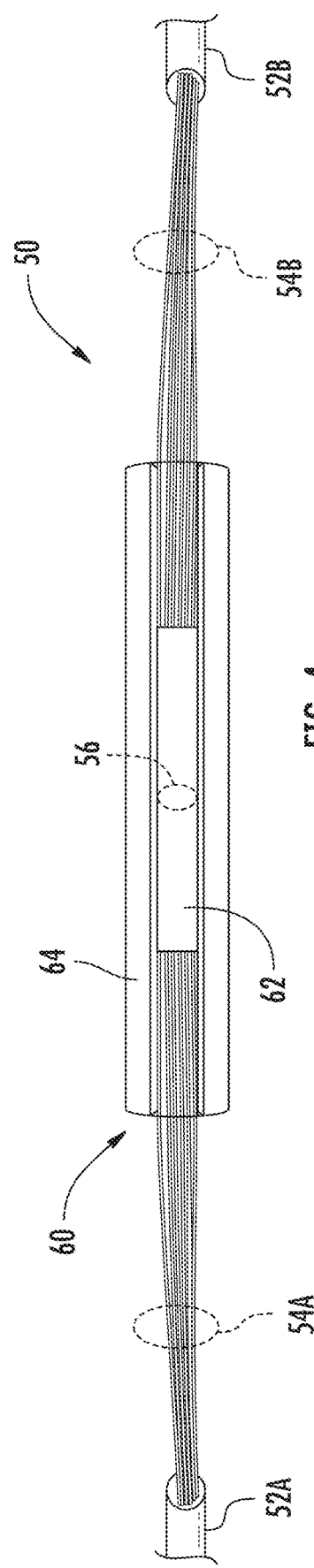
FIG. 4 is a side view illustration of segments of two small round-type fiber optic cables from which twelve loose fibers extend, with the loose fibers being spliced in a one-dimensional array and protected by a conventional multi-fiber heat shrink protection sleeve.
Figure 5:
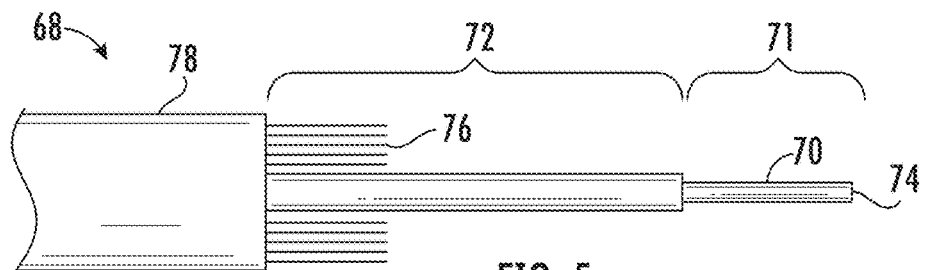
FIG. 5 is a schematic side view illustration of a conventional fiber optic cable including an optical fiber and strength members surrounded by a jacket, with portions of the optical fiber and strength members extending beyond the jacket.
Figure 6:
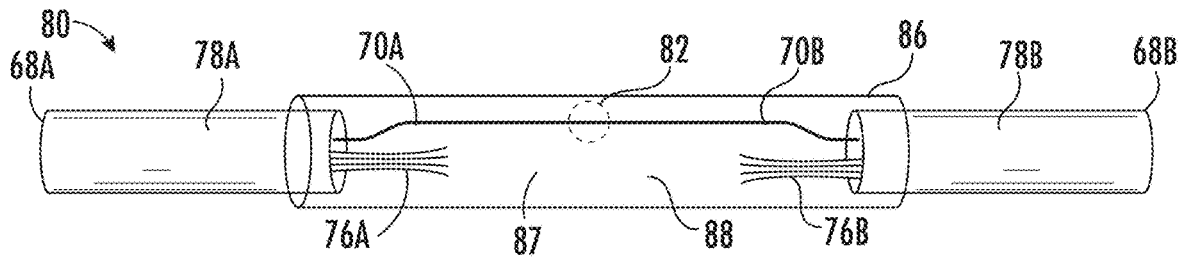
FIG. 6 is schematic side view illustration of a conventional spliced fiber optic cable including a housing filled with epoxy for securing strength members of two fiber optic cable segments and protecting a splice between optical fibers of the fiber optic cable segments.

Various embodiments will be further clarified by examples in the description below. In general, the description relates to a fiber optic cable assembly including at least one spliced (e.g., fusion spliced) optical fiber as well as overlapping bundled sections of strength members that are adhered to one another. A method and an apparatus permitting fabrication of such a fiber optic cable assembly are further provided.

In this disclosure, the language "strength member," in the context of such a member arranged within a jacket of a fiber optic cable, refers to a member that extends generally parallel to an optical fiber, is typically flexible in character, and serves to enhance tensile strength of a fiber optic cable. Typical strength members used in fiber optic cables include aramid yarn (e.g., Kevlar).

Likewise, in this disclosure, the language "bundled section of strength members" or simply "bundled section" refers to a length of strength members that are retained by or otherwise adhered with a binding material. In certain embodiments, such a binding material may comprise a thermoplastic binding material, with one representative example including polyamide material. In certain embodiments, strength members may be generally aligned in a linear array in a bundled section of strength members, and therefore resemble a ribbon of strength members.

In this disclosure, the language "fusion spliced optical fiber" refers to two optical fibers that have been fusion spliced together to form a permanent, optical link incorporating the two optical fibers. The singular noun "fusion spliced optical fiber" is used even though two optical fibers are initially present because, after fusion splicing, the resulting optical link is intended to function like a continuous optical fiber (even though there may be some attenuation resulting from the fusion splice joint). Using the singular form also facilitates discussions involving groups of these fusion spliced optical fibers, as will be apparent. A fusion spliced optical fiber may desirably include a polymeric overcoating over the fusion splice joint as well as over stripped portions of optical fibers proximate to the fusion splice joint.

Likewise, in this disclosure, the two optical fibers that define a given "fusion spliced optical fiber" may alternatively be referred to as "optical fiber segments." Using the language "optical fiber segments" rather than "optical fibers" helps clarify when the disclosure is referring to one of the pairs of optical fibers that form one of the fusion spliced optical fibers, versus one of the fusion spliced optical fibers itself.

In certain embodiments, a fiber optic cable assembly includes a plurality of fusion spliced optical fibers in combination with adhered first and second bundled sections of strength members, with each spliced optical fiber including two optical fiber segments that are arranged serially and joined together by a splice (e.g., a fusion splice) to define a fusion splice joint. The fusion splice joints of the plurality of fusion spliced optical fibers define a fusion splice region of the fiber optic cable assembly. The fiber optic cable assembly may include a polymeric overcoating, in which polymeric material beneficially overcoats or encapsulates the fusion splice region and stripped sections of the optical fibers, and preferably also overcoats portions of pre-coated sections of the optical fibers proximate to the stripped sections. In certain embodiments, the maximum width and height dimensions of the polymeric material are only slightly larger than maximum width and height dimensions of an array of pre-coated sections of the optical fibers proximate to the stripped sections. For example, in certain embodiments, the largest height and width portions of the polymeric material may correspond to areas in which the polymeric material overlaps the pre-coated (i.e., acrylate coated) sections of optical fibers. In certain embodiments, the polymeric material overlap region has a length of at least 1 mm, at least 3 mm, or another length specified herein. If the polymeric material has a thickness in such regions in a range of from 0.05 to 0.3 mm, then in certain embodiments, the greatest height and/or width portion of the polymeric material may exceed a greatest height and/or width portion of a corresponding array of pre-coated sections of optical fibers (proximate to the stripped sections of optical fibers) by dimensions in one of the following ranges: a range of from 0.1 to 0.6 mm, a range of from 0.2 to 0.6 mm, a range of from 0.1 to 0.5 mm, a range of from 0.2 to 0.5 mm, a range of from 0.2 to 0.4 mm, a range of from 0.2 to 0.3 mm, a range of from 0.3 to 0.6 mm, or a range of from 0.4 mm to 0.6 mm.

Each bundled section of strength members includes a binding material (e.g., a thermoplastic binding material) joining the strength members. In certain embodiments, the binding material used to bind strength members in first and second bundled sections of strength members may comprise the same polymeric material used to provide a polymeric overcoating over fusion splices of the fusion spliced optical fibers. In certain embodiments, the binding material used to bind strength members in first and second bundled sections of strength members may comprise a polymeric material that differs from a material used to provide a polymeric overcoating over fusion splices of the fusion spliced optical fibers.

In one exemplary aspect of the disclosure, a fiber optic cable assembly includes an intermediate cable section arranged between first and second cable sections. The first cable section includes a first jacket containing at least one first optical fiber and a plurality of first strength members, and the second cable section includes a second jacket containing at least one second optical fiber and a plurality of second strength members. The intermediate cable section includes at least one splice joint (e.g., fusion splice joint) joining ends of the at least one first optical fiber and the at least one second optical fiber, and includes bundled sections of the pluralities of first and second strength members, respectively, wherein the first bundled section and second bundled section are overlapping and adhered to one another. An adhesive splice is formed between the adhered bundled sections of strength members.

When bundled sections of strength members are adhered to one another, a combined length of the adhered bundled sections is preferably controlled to be shorter than a length of the spliced optical fiber (or fibers) in the intermediate section of a fiber optic cable assembly to ensure that the strength members (instead of the spliced optical fiber(s)) bear any tensile loads that may be applied to the fiber optic cable assembly following fabrication. This result may be achieved by effectuating relative movement between optical fibers on opposing sides of a splice region (e.g., by pushing the optical fibers toward one another) to form at least one bowed optical fiber region including at least one splice joint, and then adhering first and second bundled sections of strength members to one another in an overlapping fashion while the at least one bowed optical fiber region is maintained. To achieve such an overlap, relative lengths of optical fibers and strength members emanating from each of a first and a second cable section should be adjusted (e.g., by trimming the optical fibers) to ensure that the one or more optical fibers are shorter than the strength members of an unjacketed end portion of the cable section before fusion bonding is performed.

In addition to controlling relative lengths of optical fibers and strength members, an overlap region between bundled sections of strength members adhered to one another has an overlap area that is preferably selected to meet or exceed a minimum threshold to ensure sufficient capacity of the splice between bundled sections of strength members to bear an anticipated range of tensile loads that may be applied to a fiber optic cable assembly during operation. In certain embodiments, an overlap area of an overlap region formed by bundled sections of strength members adhered to one another is selected to be at least one of the following thresholds: about 30 mm$^2$, about 50 mm$^2$, about 70 mm$^2$, about 90 mm$^2$, about 100 mm$^2$, about 120 mm$^2$, or about 150 mm$^2$. It has been empirically determined that tensile strength of spliced Kevlar strand-type (i.e., aramid yarn) strength members exceeds 50 pounds of force when the overlap area is about 90 mm$^2$ and when polyamide adhesive material is used. If higher strength adhesives are employed between bundled sections of strength members, then a smaller overlap area between bundled sections may achieve a comparable tensile strength value. In certain embodiments, the above-described overlap area may be calculated as the product of length times width of an overlap between substantially flat first and second bundled sections of strength members.

Direct adhesion between bundled sections of strength members of first and second cable sections according to fiber optic cable assemblies and fabrication methods disclosed herein avoids the need for mechanically attaching strength members to a housing (e.g., by filling a housing cavity with epoxy). In certain embodiments, a tubular covering member may be provided over an intermediate cable section (i.e., between first and second cable sections) that includes at least one splice joint as well as overlapping bundled sections of strength members that are adhered to one another, with the tubular covering member including an interior volume with at least one unfilled void. Such a tubular covering member may surround the intermediate cable section, and also overlap portions of jackets of first and second cable sections, preferably with adhesive material between the tubular covering member and the respective jackets to secure the tubular covering member and provide a barrier preventing ingress of dust and/or moisture into the interior volume. In certain embodiments, an intermediate portion of the tubular covering member defines an intermediate interior volume and surrounds the intermediate cable section, with a portion of the intermediate interior volume being filled by (i) at least one first and at least one second optical fiber with a splice joint therebetween, and desirably including overcoating material over at least the splice joints, and (ii) first and second bundled sections of strength members, wherein another portion of the intermediate interior volume embodies at least one unfilled void. In certain embodiments, an aggregate volume of the at least one unfilled void is at least about ten percent (or at least about twenty percent) of the intermediate interior volume. This is in contrast to a conventional epoxy-filled housing, in which even the accidental formation of an air bubble would be unlikely to represent a double-digit percentage of an interior volume of the housing.

Figure 7A:
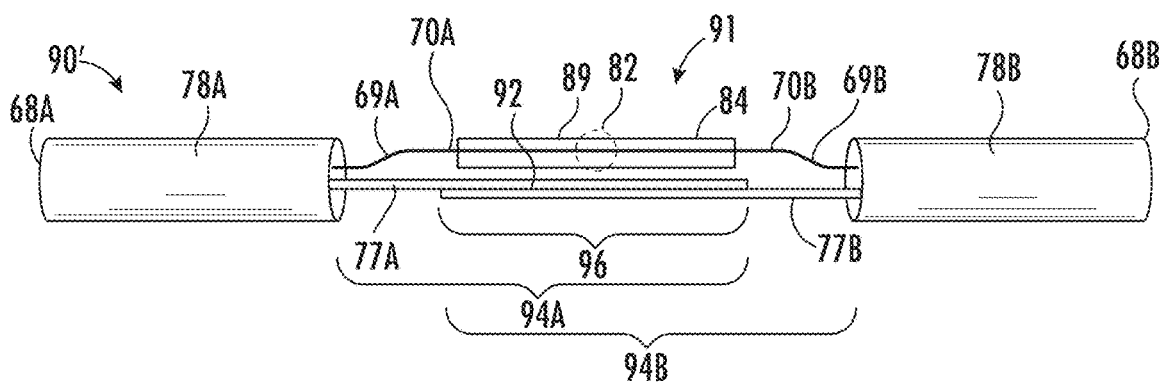
FIG. 7A is a schematic side view illustration of a fiber optic cable assembly according to one embodiment during a fabrication step prior to addition of a tubular covering member, the fiber optic cable assembly including first and second cable sections and an intermediate cable section containing an overcoated fusion spliced optical fiber as well as overlapping and adhered bundled sections of strength members emanating from the first and second cable sections.

FIG. 7A is a schematic side view illustration of a fiber optic cable assembly 90' according to one embodiment during a fabrication step prior to addition of a tubular covering member. The fiber optic cable assembly 90' includes first and second cable sections 68A, 68B and an intermediate cable section 91 that contains an overcoated fusion spliced optical fiber 89 as well as first and second bundled sections of strength members 77A, 77B (emanating from the first and second cable sections 68A, 68B, respectively) that are arranged an overlapping configuration with an adhesive joint 92 therebetween. The overcoated fusion spliced optical fiber 89 includes optical fiber segments 70A, 70B that are joined by a fusion splice joint 82, with a polymeric overcoating material 84 arranged over the fusion splice joint 82 as well as stripped portions of the optical fiber segments 70A, 70B. Bends 69A, 69B provided in the optical fiber segments 70A, 70B form a slight bow in the overcoated fusion spliced optical fiber 89. As shown, the first bundled section of strength members 77A has a length 94A that is greater than a length of the first optical fiber segment 70A extending between a first jacket 78A and the splice joint 82, and the second bundled section of strength members 77B similarly has a length 94B that is greater than a length of the second optical fiber segment 70B extending between a second jacket 78B and the splice joint 82. As shown, an overlap distance 96 between the first and second bundled sections of strength members 77A, 77B may be at least as long as, or longer than, a length of the polymeric overcoating material 84 in certain embodiments.

Figure 7B:
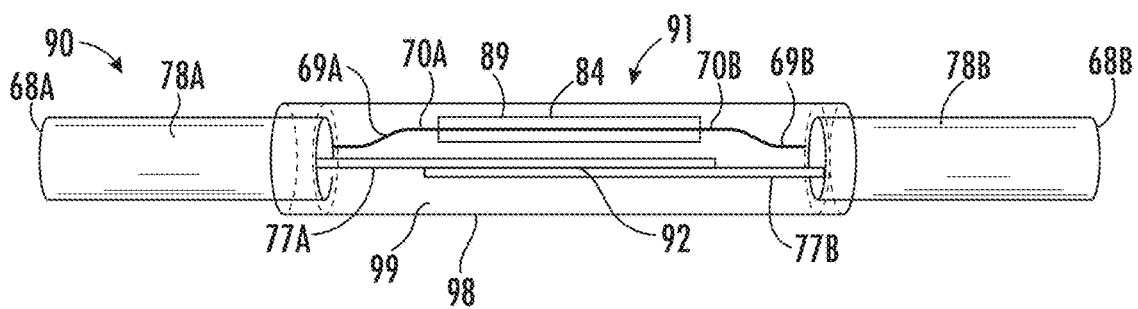
FIG. 7B is a schematic side view illustration of a fiber optic cable assembly according to one embodiment substantially identical to that of FIG. 7A, but with the addition of a tubular covering member to the intermediate cable section to cover the overcoated fusion spliced optical fiber and the adhered bundled sections of strength members.

FIG. 7B is a schematic side view illustration of a fiber optic cable assembly 90 according to one embodiment substantially identical to that of FIG. 7A, but with addition of a tubular covering member 98 over the intermediate cable section 91 to cover the overcoated fusion spliced optical fiber 89 and the first and second bundled sections of strength members 77A, 77B. Ends of the tubular covering member 98 also overlap portions of the jackets 78A, 78B of the first and second cable sections 68A, 68B. The tubular covering member 98 defines an interior volume 99 that contains the overcoated fusion spliced optical fiber 89 as well as the adhered, overlapping first and second bundled sections of strength members 77A, 77B. Preferably, the interior volume 99 includes at least one unfilled void that is devoid of epoxy or other adhesive material, since direct adhesive splicing between the overlapping first and second bundled sections of strength members 77A, 77B avoids the need for the strength members to be affixed to the tubular covering member 98. Further, the tubular covering member 98 is preferably devoid of any heat shrink tube arranged over any portions of a splice joint of the overcoated fusion spliced optical fiber 84. The remaining elements of FIG. 7B are identical to those shown in FIG. 7A and will not be described again.

Figure 7C:
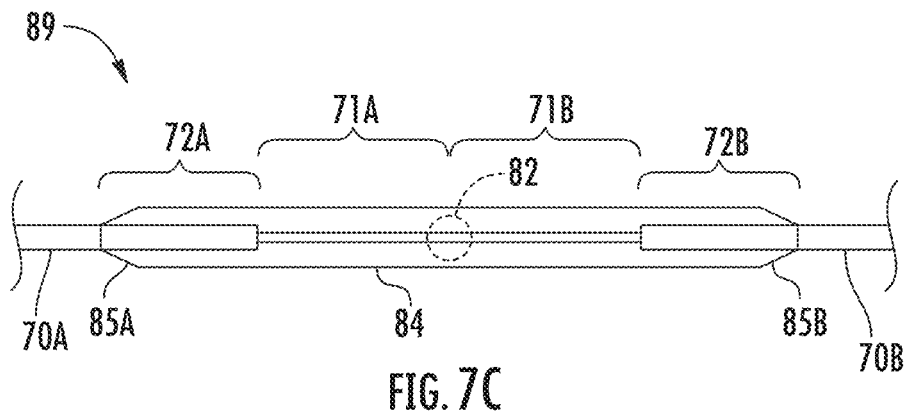
FIG. 7C is a magnified central portion of FIGS. 7A and 7B including the overcoated fusion spliced optical fiber.

FIG. 7C is a magnified central portion of FIGS. 7A and 7B including the overcoated fusion spliced optical fiber 89, composed of optical fiber segments 70A, 70B and a solid overcoating 84 of thermoplastic material having a substantially constant outer diameter over the majority of its length. Each optical fiber segment 70A, 70B includes a coating (e.g., an acrylate coating), with portions of each optical fiber segment 70A, 70B being previously stripped of such coating to form stripped sections 71A, 71B embodying glass cladding. Ends of the stripped sections 71A, 71B are fusion spliced at a splice joint 82 to form a fusion spliced optical fiber. The solid overcoating 84 of polymeric material extends over the splice joint 82, the previously stripped sections 71A, 71B, and short lengths 72A, 72B of the coated optical fiber segments 70A, 70B. As shown in FIG. 7C, the solid overcoating 84 may include tapered thickness ends 85A, 85B, with a remainder of the solid overcoating 84 having a substantially constant outer diameter that exceeds an outer diameter of the pre-coated optical fiber segments 70A, 70B. The coated optical fiber segments 70A, 70B may each have a nominal outer diameter of 0.25 mm (250 μm) in some embodiments. In certain embodiments, the solid overcoating 84 of polymeric material may include an outer diameter in a range of from 0.2 mm to 0.9 mm, from 0.2 mm to 0.7 mm, from 0.2 to 0.5 mm, from 0.25 mm to 0.9 mm, from 0.25 to 0.7 mm, or from 0.25 to 0.5 mm.

Although only a single overcoated fusion spliced optical fiber 89 is shown in FIG. 7C, it is to be appreciated that a solid overcoating similar to the solid overcoating 84 shown in FIG. 7C may be applied to multiple fusion spliced optical fibers arranged in a one-dimensional array. In such a situation, the above-described outer diameter values for solid overcoating of polymeric material may correspond to thickness values for the solid overcoating applied to an array of fusion spliced optical fibers.

In certain embodiments, a polymeric material used to overcoat fusion spliced optical fibers comprises a thermoplastic material that may be heated to a flowable state. In certain embodiments, the polymeric material useable to overcoat fusion spliced optical fibers comprises a flowable photopolymerizable adhesive, such as a UV-curable polymeric material that may be solidified by impingement of ultraviolet emissions thereon. In certain embodiments, a polymeric material may be devoid of UV-curable components. In certain embodiments, a polymeric material in a flowable state comprises a moisture-curable polymeric material or a two-part adhesive that may be solidified by supplying moisture or a curing agent to the polymeric material. In certain embodiments, fusion spliced optical fibers may be temporarily placed in a cavity (e.g., a mold cavity), a housing, a trough, or a container in which polymeric material in a flowable state is present, or to which polymeric material in a flowable state is supplied. In certain embodiments, fusion spliced optical fibers may be dipped into (or otherwise contacted with) a pool of molten thermoplastic material to effectuate coating. In certain embodiments, a polymeric material that may be used to overcoat portions of fusion spliced optical fibers may include one or more of polyamide, polyolefin, a polyamide-polyolefin copolymer, a polyamide grafted polyolefin, and a copolyester. Other polymeric materials (including thermoplastic materials) may be used. In certain embodiments, a polymeric material that may be used to overcoat portions of fusion spliced optical fibers may include a melt-flow thermoplastic adhesive material.

In certain embodiments, a polymeric overcoating as disclosed herein is arranged over a splice joint, as well as over stripped sections and pre-coated sections of fusion spliced optical fibers (e.g., including at least a short distance of acrylate coated sections proximate to the stripped sections). At least a portion of the polymeric overcoating includes a diameter that exceeds a diameter of one or more pre-coated sections of the fusion spliced optical fibers. Exemplary optical fibers include 250 μm or 200 μm diameter acrylate coated fibers without any additional buffer layer.

A desirable polymeric overcoating material is preferably not subject to delamination during normal handling over the required service conditions and lifetime of a fiber optic cable. In certain embodiments, flowable polymeric material used to fabricate a polymeric overcoating comprises molten thermoplastic material. To avoid thermal degradation of one or more acrylate coating layers of the pre-coated sections of the fusion spliced optical fibers, molten thermoplastic material to be used for overcoating should be maintained at a processing temperature below a melt temperature of the one or more acrylate coating layers. To promote formation of a suitable overcoating, the molten thermoplastic material may also be maintained at a processing temperature at which the molten thermoplastic material has a melt viscosity in a range of from about 100 centipoises (cps) to about 10,000 cps, or more preferably in a subrange of from about 1,000 cps to about 10,000 cps, or more preferably in a subrange of from about 2,000 cps to about 4,000 cps.

In certain embodiments, desirable thermoplastic overcoating materials differ from conventional melt flow adhesive glue sticks or typical thermoplastic materials in that they should desirably: have a medium viscosity (e.g., according to one or more of the ranges outlined above) at a processing temperature, be chemically stable at the processing temperature, have a glass transition temperature of no greater than −40° C., have a service temperature spanning at least a range of from −40° C. to 85° C. without suffering significant mechanical and/or optical performance degradation, exhibit strong adhesion to fiber coating layers and bare glass, be free from charring, and/or exhibit minimal to no outgassing (e.g., of volatile organic compounds and/or other constituents). A glass transition temperature is the point at which a material goes from a hard brittle state to a flexible or soft rubbery state as temperature is increased. A common method for determining glass transition temperature uses the energy release on heating in differential scanning calorimetry. If a plastic (e.g., thermoplastic) material associated with an optical fiber is exposed to a temperature below its glass transition temperature, then the material will become very hard, and the optical fiber may be susceptible to micro bend losses. In certain embodiments, service temperature of a thermoplastic overcoating material may be determined by compliance with one or more industry standards for telecommunication fiber reliability testing, such as (but not limited to): ITU-T G.652, IED60793-2, Telcordia GR-20-CORE and TIA/EIA-492.

Formation of a solid thermoplastic overcoating over at least a short distance of pre-coated sections of optical fibers bounding a spliced segment (e.g., at either end of stripped sections joined at a splice joint) beneficially ensures that all previously stripped (glass) sections are fully overcoated. In certain embodiments, a solid thermoplastic overcoating extends over a length of a pre-coated section of each of the first and second optical fibers, wherein the overcoated length of each pre-coated section is in a range of from about 1 mm to about 10 mm. Additionally, since the solid thermoplastic overcoating may adhere to one or more coating layers of an optical fiber more readily than to (pre-stripped) exposed glass sections, providing a solid thermoplastic overcoating of sufficient length to overlap at least a short distance of pre-coated sections of optical fibers bounding a spliced segment promotes more secure adhesion between the solid thermoplastic overcoating and the fusion spliced segment as a whole. In certain embodiments, a solid thermoplastic overcoating and a fusion spliced segment utilize a thermoplastic material that is devoid of additives configured to promote adhesion to glass, such as silane. A solid thermoplastic overcoating as disclosed herein is preferably not subject to delamination during normal handling over the required service conditions and lifetime of a fiber optic cable.

In preferred embodiments, a solid thermoplastic overcoating is water-resistant and serves to block moisture from reaching the splice joint and the previously stripped glass region of a fusion spliced segment of optical fibers. This is beneficial since moisture is known to chemically interact with glass cladding of optical fibers and cause expansion of micro defects in the glass, thereby leading to long-term failure of optical fibers. The solid thermoplastic overcoating is preferably also devoid of sharp particles (e.g., inorganic filler particles) and air bubbles. The solid thermoplastic overcoating may also be devoid of a UV curable material. In certain embodiments, formation of air bubbles may be reduced by contacting stripped sections and pre-coated sections of fusion spliced first and second optical fibers with molten thermoplastic material in a subatmospheric pressure environment (e.g., in a range of from 0.01 to 0.9, or 0.1 to 0.8, or 0.1 to 0.7 times local atmospheric pressure), such as may be attained in a partially evacuated chamber or other enclosure.

Various steps of a method for fabricating a fiber optic cable assembly incorporating adhered, overlapping bundled sections of strength members may be understood with reference to FIGS. 8A-8E.

Figure 8A:
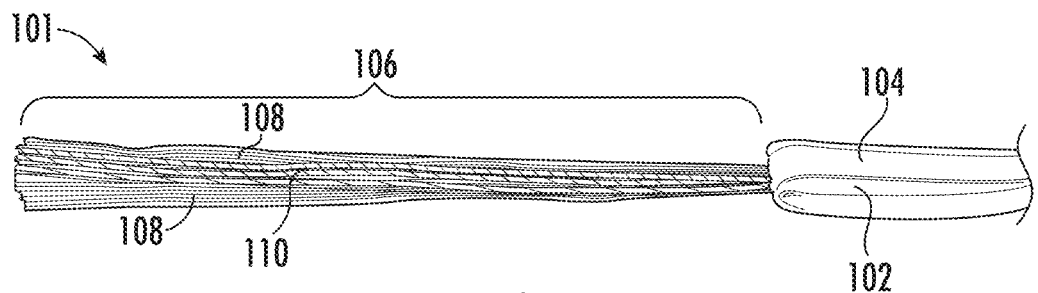
FIG. 8A is a side view illustration of a fiber optic cable section including a jacket as well as multiple optical fibers and strength members, with portions of the optical fibers and strength members being exposed following removal and peeling back of split portions of the jacket.

FIG. 8A is a side view illustration of a fiber optic cable section 101 including a jacket 102 containing multiple (e.g., twelve) optical fibers 110 and strength members 108 (e.g., of Kevlar aramid yarn) therein, with a length 106 of the optical fibers 110 and strength members 108 being exposed following removal and peeling back of split portions 104 of the jacket 102. As illustrated, the strength members 108 are dispersed among the optical fibers 110.

Figure 8B:
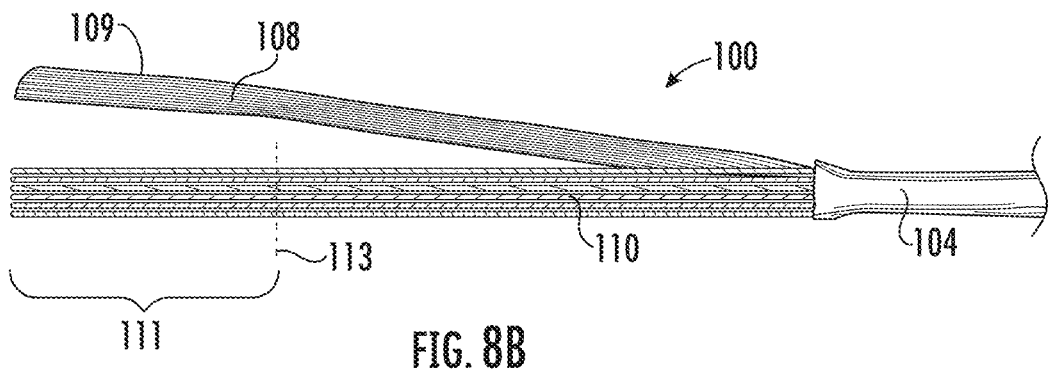
FIG. 8B is a side view illustration of the fiber optic cable section of FIG. 8A following separation of the strength members from the optical fibers and addition of a binding material to form a bundled section of the strength members.

FIG. 8B is a side view illustration of a fiber optic cable section 100 following performance of processing steps relative to the configuration of FIG. 8A—namely, to separate the strength members 108 from the optical fibers 110, to add a binding material to the strength members 108 to form a bundled section 109 of the strength members 108, and to add a binding material to optical fibers 110 to form a ribbon. In certain embodiments, the strength members 108 may be generally aligned in a linear array in the bundled section 109 to resemble a flat ribbon having a greater width than height. In certain embodiments, the binding material may comprise a polymeric binding material as disclosed herein (with such a material potentially being the same as, or different from, any polymeric overcoating material disclosed herein for coating portions of the optical fibers 110). In certain embodiments, the binding material may comprise a thermoplastic binding material, such as (but not limited to) a polyamide material. In certain embodiments, the binding material used for bundling strength members is a thermoplastic adhesive material having a softening temperature of at least 120° C., and a shear strength when bonding the strength members 108 of at least 689 kPa (100 psi).

In certain embodiments, strength members 108 may be aligned in a generally linear array and contacted with polymeric material in a flowable state, and thereafter the polymeric material may be hardened to a solid state to encapsulate or otherwise adhere the strength members 108 to form the bundled section 109. As shown in FIG. 8B, the optical fibers 110 may also be arranged in a linear array to facilitate utilization of a mass fusion splicing process to simultaneously fusion splice ends of the optical fibers 110 to optical fibers of another fiber optic cable section (not shown). As further shown in FIG. 8B, following bundling of the strength members 108 and ribbonization of the optical fibers 110, end portions 111 of the optical fibers 110 may be removed, such as by cutting the optical fibers 110 along a cut line 113. Following removal of the end portions 111, the remaining optical fibers 110 emanating from the jacket (102, shown in FIG. 8A) will be shorter in length than a length of the bundled sections 109 of strength members 108 (with such length corresponding to the length 106 shown in FIG. 8A).

Figure 8C:
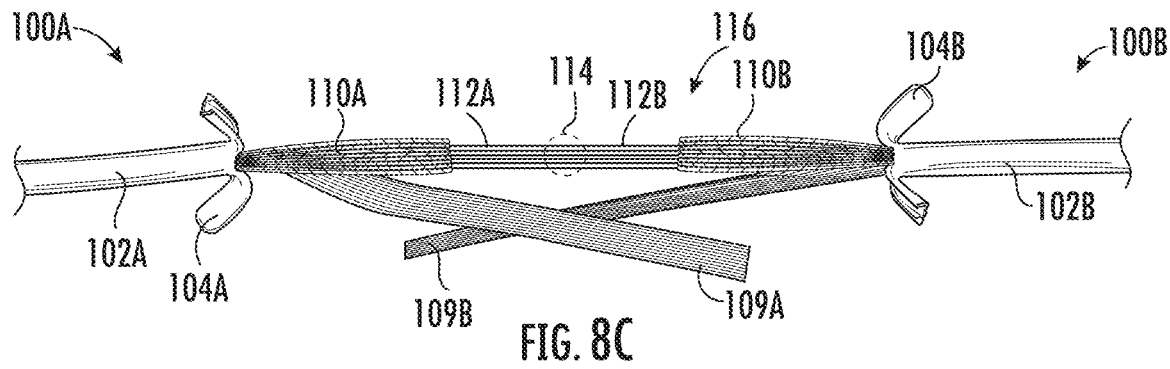
FIG. 8C is a side view illustration of two (i.e., first and second) fiber optic cable sections according to FIG. 8B during a step of fabricating a fiber optic cable assembly, following fusion splicing of ends of stripped sections of the fiber optic cable sections, prior to a step of adhering bundled sections of strength members of the first and second fiber optic cable sections.

FIG. 8C is a side view illustration of first and second fiber optic cable sections 100A, 100B (each generally in accordance with the fiber optic cable section 100 shown in FIG. 8B), following the stripping of acrylate coating material from portions of optical fibers 110A, 110B to form stripped sections 112A, 112B, and following fusion splicing of ends of the stripped sections 112A, 112B at a fusion splice region 114 to form fusion spliced optical fibers 116. In certain embodiments, stripped sections 112A, 112B of each fiber optic cable section 100A, 100B may be at least temporarily ribbonized prior to splicing to maintain consistent spacing for performance of a mass fusion splicing process. The fusion splicing between ends of stripped sections 112A, 112B is completed prior to adhering the bundled sections 109A, 109B of strength members to one another. During such fusion splicing, the bundled sections 109A, 109B may be folded in a rearward direction away from the fusion splice region 114. The first fiber optic cable section 100A includes multiple first optical fibers 110A and multiple first strength members (i.e., embodied in the first bundled section 109A) exposed following removal and peeling back of split portions 104A of a first jacket 102A. The second fiber optic cable section 100B includes multiple second optical fibers 110B and multiple second strength members (i.e., embodied in the second bundled section 109B) exposed following removal and peeling back of split portions 104B of a second jacket 102B. The first and second bundled sections 109A, 109B of strength members are shown as being oriented to the same side relative to the fusion spliced optical fibers 116.

In certain embodiments, pre-coated (i.e., acrylate coated) optical fibers subject to being fusion bonded and overcoated (or encapsulated) according to methods disclosed herein are prepared for fusion bonding (e.g., by stripping ends thereof) utilizing non-contact fiber stripping methods and/or apparatuses, such as those disclosed in U.S. Pat. No. 9,167,626 B2 ("the '626 patent"), which is hereby incorporated by reference. Briefly, the '626 patent discloses use of a heater configured for heating a heating region to a temperature above a thermal decomposition temperature of at least one coating of an optical fiber, a securing mechanism for securely positioning a lengthwise section of the optical fiber in the heating region, and a controller operatively associated with the heater and configured to deactivate the heater no later than immediately after removal of the at least one coating from the optical fiber. Thermal decomposition of at least one coating of an optical fiber reduces or minimizes formation of flaws in optical fibers that may be generated by mechanical stripping methods and that can reduce their tensile strength.

Figure 8D:
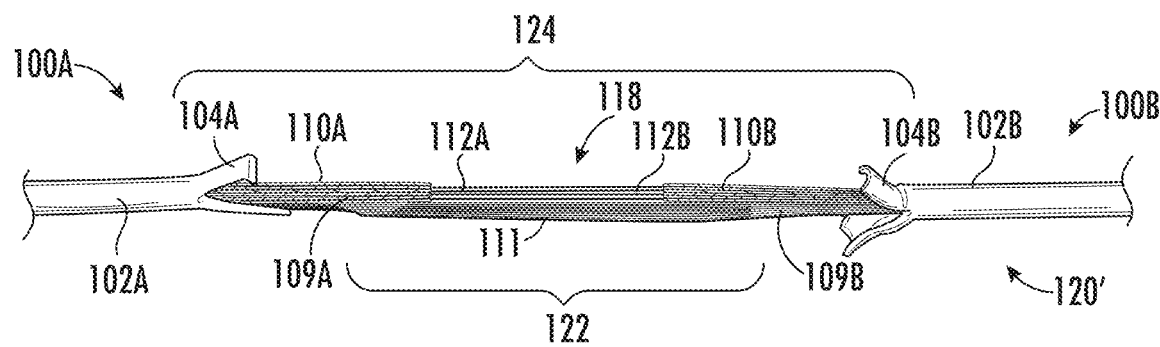
FIG. 8D is a side view illustration of the fusion spliced first and second fiber optic cable sections according to FIG. 8C during another step of fabricating a fiber optic cable assembly, after overlapping and adhering the strength members of the first and second fiber optic cable sections, to yield an uncovered fiber optic cable assembly.

FIG. 8D is a side view illustration of an uncovered fiber optic cable assembly 120' (i.e., lacking a tubular covering member) including the first and second fiber optic cable sections 100A, 100B of FIG. 8C following a step of overcoating the stripped sections 112A, 112B with a overcoating material to form overcoated fusion spliced optical fibers 118, and following a step of overlapping and adhering the first and second bundled sections 109A, 109B of strength members. During a step of overcoating the stripped sections 112A, 112B, the bundled sections 109A, 109B may be folded in a rearward direction away from the fusion splice region 114. The bundled section 109A, 109B form an overlap region 122 that may exceed a length of the stripped sections 112A, 112B of the overcoated fusion spliced optical fibers 118. As shown, the first and second bundled sections 109A, 109B of strength members are arranged to one side of the overcoated fusion spliced optical fibers 118, and are thus form an overlap region arranged to one side of a plane that includes a longitudinal axis definable through cores of the optical fibers 110A, 110B without the bundled sections 109A, 109B being distributed around an entire circumference of a longitudinal axis of any core of the optical fibers 110A, 110B (e.g., at least in a fusion splice region 114, as illustrated in FIG. 8C). As shown in FIG. 8D, the uncovered fiber optic cable assembly 120' includes an intermediate cable section 124 arranged between the first and second fiber optic cable sections 100A, 100B. In certain embodiments, the first optical fibers 110A may be moved toward the second optical fibers 110B to form at least one bowed optical fiber region including the fusion splice region 114, and the first and second bundled sections 109A, 109B of strength members may be adhered together while the at least one bowed optical fiber region is maintained. Such steps help ensure that the adhered, bundled sections 109A, 109B of strength members are shorter than the overcoated fusion spliced optical fibers 118 so that the bundled sections of strength members 109A, 109B (instead of the overcoated fusion spliced optical fibers 118) will bear any tensile loads that may be applied to the uncovered fiber optic cable assembly 120' (or applied to a fiber optic cable assembly including a tubular covering member, such as described in connection with FIG. 8F).

Figure 8E:
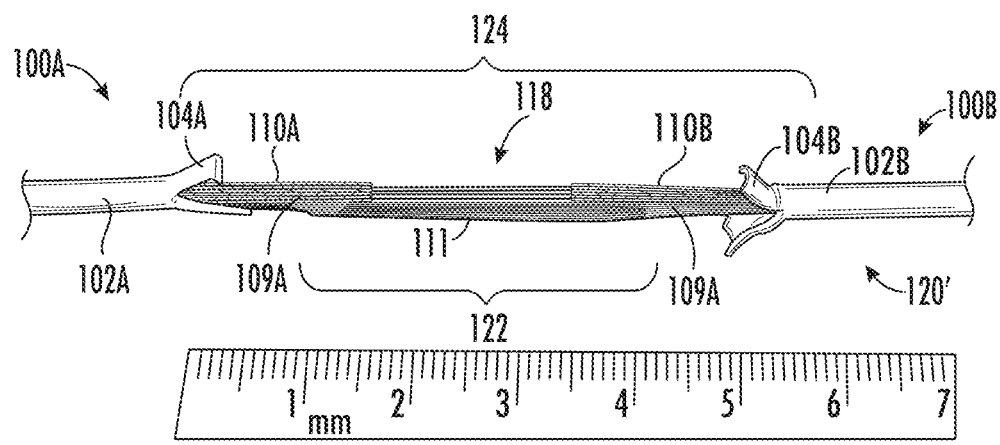
FIG. 8E is a side view illustration of the uncovered fiber optic cable assembly of FIG. 8D arranged proximate to a metric ruler to show a length of an intermediate cable section arranged between jacketed portions of the first and second fiber optic cable sections.

FIG. 8E illustrates the uncovered fiber optic cable assembly 120' of FIG. 8D arranged proximate to a metric ruler, showing the intermediate cable section 124 as having a length of 5 cm, and showing the intermediate cable section 124 as having a width comparable to that of the first and second jackets 102A, 102B. All elements of FIG. 8E other than the metric ruler are identical to those shown in FIG. 8D and will not be described again.

Figure 8F:
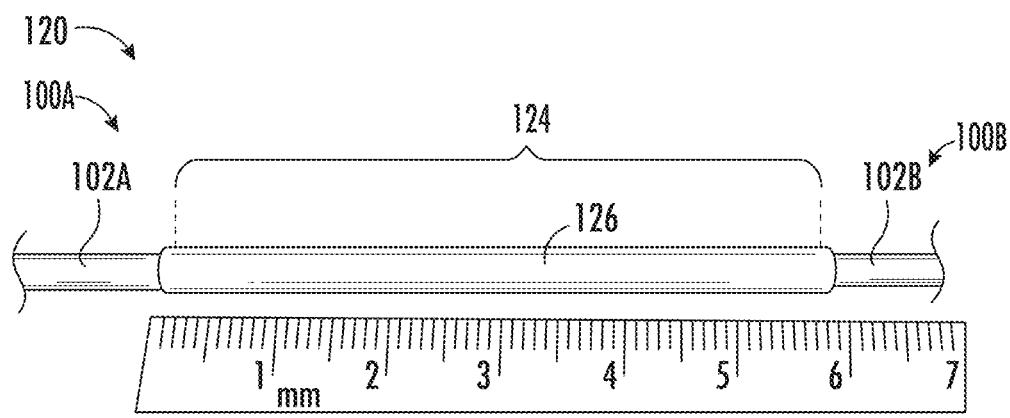
FIG. 8F is a side view illustration of the fusion spliced first and second fiber optic cable sections of FIGS. 8D and 8E following the positioning of a tubular covering member to surround the intermediate cable section as well as portions of the jackets of the first and second fiber optic cable sections, with a metric ruler in the foreground to show a length of the tubular covering member.

FIG. 8F is a side view illustration of a fiber optic cable assembly 120 substantially similar to the assembly 120' shown in FIGS. 8D and 8E, following the positioning of a tubular covering member 126 (e.g., a tube of stainless steel, another metal, plastic, carbon fiber composites, or another suitable material) to surround the intermediate cable section 124 as well as portions of the jackets 102A, 102B of the first and second fiber optic cable sections 100A, 100B. An adhesive material (not shown) may be provided between end portions of the tubular covering member 126 and the jackets 102A, 102B to promote sealing therebetween, but preferably an interior volume of the tubular covering member includes at least one unfilled void (and accordingly is not filled completely with epoxy or other potting material). A metric ruler illustrated in the foreground shows a length of the tubular covering member 126 as being around 6 cm. Such length is slightly longer than the intermediate cable section 124 to enable the tubular covering member 126 to surround portions of the first and second jackets 102A, 102B.

In certain embodiments, the tubular covering member 126 may cover only the stripped sections 112A, 112B and splice region 114, and heat shrink tubing may be used to cover the remaining regions between the jackets 102A, 102B and the tubular covering member 126.

Consistent with the foregoing discussion of FIGS. 8A-8E, one step according to a method for fabricating a fiber optic cable assembly includes processing a first cable section, including at least one first optical fiber and a plurality of first strength members within a first jacket, to bind an unjacketed segment of the plurality of first strength members into a first bundled section of the plurality of first strength members. Another step includes processing a second cable section, including at least one second optical fiber and a plurality of second strength members within a second jacket, to bind an unjacketed segment of the plurality of second strength members into a second bundled section of the plurality of second strength members. The method additionally comprises fusion splicing ends of the at least one first optical fiber and the at least one second optical fiber to form at least one splice joint defining a splice region of the fiber optic cable assembly, wherein each of the at least one first optical fiber and the at least one second optical fiber comprises a stripped portion proximate to the at least one splice joint. The method further comprises forming a polymeric overcoating over the at least one splice joint and over the stripped portion of each of the at least one first optical fiber and the at least one second optical fiber. The method further comprises positioning the first bundled section of the plurality of first strength members and the second bundled section of the plurality of second strength members in an overlapping arrangement, and adhering the overlapped first and second bundled sections to one another.

In certain embodiments, relative movement is effected between the at least one first optical fiber and the at least one second optical fiber to form at least one bowed optical fiber region including the at least one splice joint, and the first and second bundled sections are adhered to one another while the at least one bowed optical fiber region is maintained. In certain embodiments, any adhesive joining method disclosed herein or known in the art may be used to adhere the first and second bundled sections. In certain embodiments, the first and second bundled sections may be adhered to one another using a thermoplastic material.

In certain embodiments, each bundled section of strength members may be formed by contacting a plurality of strength members with at least one polymeric material in a flowable state and solidifying the at least one polymeric material to form the section. Thereafter, in certain embodiments, overlapped first and second bundled sections of strength members may be adhered to one another by heating the first and second bundled sections at or above a melting temperature of the at least one polymeric material, and re-solidifying the at least one polymeric material. In certain embodiments, strength members are generally aligned in a linear array in the first and second bundled sections of strength members.

In certain embodiments, first and second cable sections may each be processed to provide unjacketed segments of strength members having a length exceeding a length of unjacketed segments of one or more optical fibers of the same cable section. This may be accomplished by trimming optical fiber segments shorter than strength members following removal of a jacket surrounding the optical fibers and strength members.

In certain embodiments, unjacketed optical fiber segments separated from strength members emanating from the same jacket may be initially loose, but subsequently ribbonized to provide consistent spacing between fibers to facilitate utilization of a mass fusion splicing process for forming multiple splice joints between multiple pairs of optical fibers in a substantially simultaneous manner. To fabricate an optical fiber ribbon, optical fibers of an unjacketed segment may be contacted with at least one polymeric material in a flowable state, and the at least one polymeric material may be solidified. When optical fiber ribbons are used, mass fusion splicing may be performed between ends of optical fibers of a first optical fiber ribbon and ends of optical fibers of a second optical fiber ribbon.

Optical fibers of a first plurality of optical fiber segments and of a second plurality of optical fiber segments to be fusion bonded may be arranged in first and second conventional fiber sorting fixtures, respectively, during stripping and/or fusion bonding steps. A typical fiber sorting fixture includes a slot having an opening dimension (e.g., height) that closely matches a corresponding dimension of unbuffered, coated optical fibers to maintain portions of the optical fibers proximate to ends to be stripped (and subsequently fusion spliced) in fixed, substantially parallel positions embodying a one-dimensional array. In certain embodiments, coated optical fibers having outer diameters of either 200 μm or 250 μm may laterally abut one another in a fiber sorting fixture, such that cores of adjacent optical fibers are also spaced either 200 μm or 250 μm apart. After stripping of acrylate coating material from end sections (to form stripped sections) of the optical fibers, the remaining (bare glass) cladding and core portions are in a non-contacting (and non-crossing) relationship, and bare glass ends of the optical fibers may be fusion bonded using conventional fusion bonding method steps known to those skilled in the art. Mass fusion bonding may be used in any embodiments disclosed herein. Variations of the techniques disclosed in the '626 patent are disclosed in U.S. Pat. Nos. 10,018,782 and 9,604,261, the disclosures of which are also hereby incorporated by reference herein. Non-contact stripping methods using lasers or hot gases are also possible in certain embodiments.

Figure 9A:
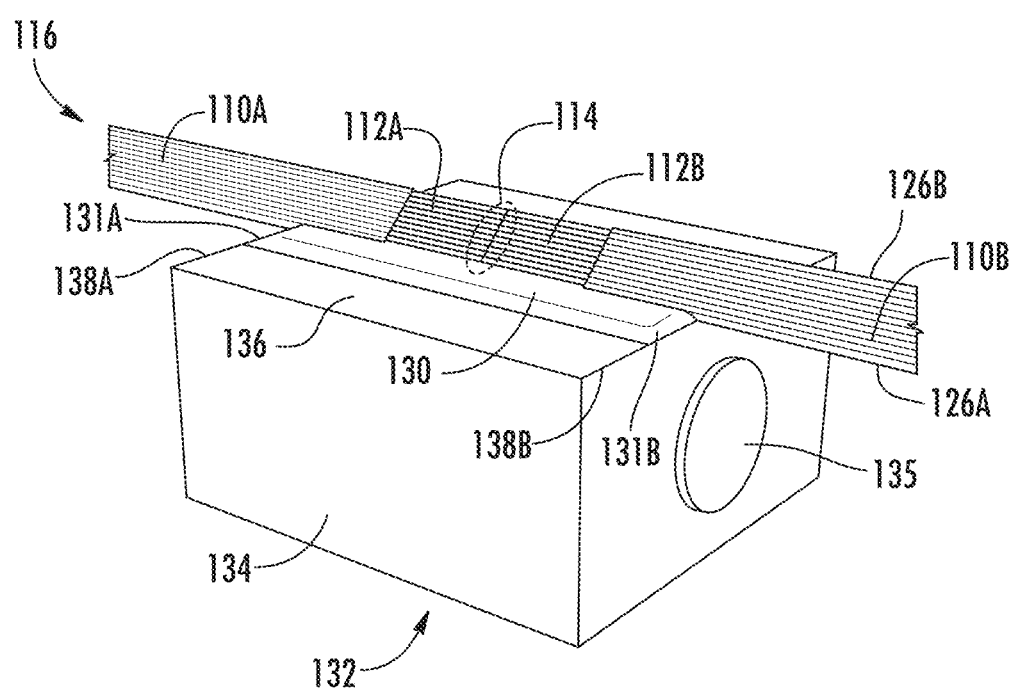
FIG. 9A is an upper perspective view illustration of a bare, mass fusion spliced section of two multi-fiber ribbon segments forming a spliced ribbon cable, with a first lateral edge portion of the spliced ribbon cable submerged in a pool of molten thermoplastic material atop a substantially level, flat heated surface, and with the ribbon cable being tilted at an approximately forty-five degree angle relative to the flat heated surface during a ribbon insertion step, such that a second lateral edge portion of the spliced ribbon cable is arranged at a level above the first lateral edge portion.
Figure 9B:
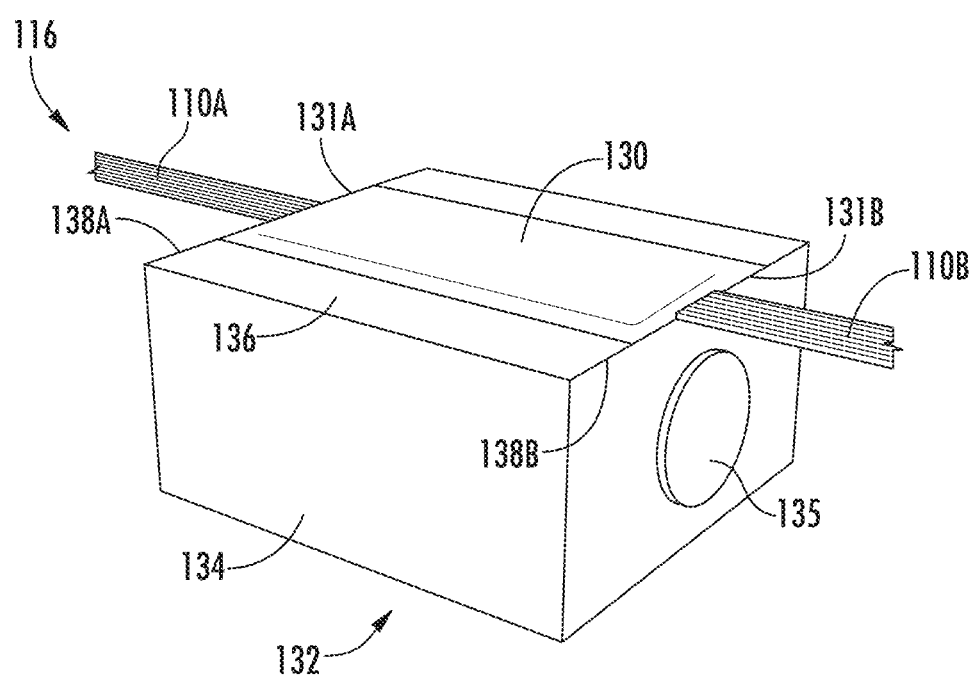
FIG. 9B illustrates the items of FIG. 9A, with the entire mass fusion spliced section of the spliced ribbon cable disposed in the pool of molten thermoplastic material atop the substantially level, flat heated surface, and with the first lateral edge portion being arranged at substantially the same horizontal level as the second lateral edge portion of the spliced ribbon cable.

FIGS. 9A and 9B illustrate a heating apparatus 132 useable for coating multiple fusion spliced optical fibers 116 with thermoplastic material. The multiple fusion spliced optical fibers 116 are composed of a first group of optical fiber segments 110A and a second group of optical fiber segments 110B, with ends of stripped sections 112A, 112B of the optical fiber segments 110A, 110B being fusion spliced at a fusion splice region 114. The heating apparatus 132 includes a body 134 that contains an internal electric cartridge heater 135. A pool of molten thermoplastic material 130 is arranged atop a substantially level, flat heated surface 136. Lateral edges 13A, 13B of the pool of molten thermoplastic material 130 extend to lateral edges 138A, 138B of the flat heated surface 136 without overflowing, due to lower temperature at the lateral edges 138A, 138B as well as surface tension of the molten thermoplastic material 130. FIG. 9A illustrates the fusion spliced optical fibers 116 arranged above the pool of molten thermoplastic material 130, with the fusion splice region 114 roughly centered above the pool, and with the length of the pool exceeding the combined length of the stripped sections 112A, 112B. As shown, the fusion spliced optical fibers 116 are tilted laterally (or angled relative to the flat heated surface 136) so that a first side 126A of the fused optical fibers 116 initially contacts the pool of molten thermoplastic material 130, while a second side 126B of the fusion spliced optical fibers 116 remains elevated above the pool. Thereafter, the remainder of the fusion spliced optical fibers 116 gradually tilts to a more horizontal orientation and is submerged into the pool, as shown in FIG. 9B. Such figure shows the stripped sections 112A, 112B and the splice region 114 of the fusion spliced optical fibers 116 submerged in the pool of molten thermoplastic material 130.

Thereafter, the multiple fusion spliced optical fibers 116 may be removed from the pool of molten thermoplastic material 130 in substantially a reverse manner from which it was introduced into the pool, and the molten liquid contacting the fusion spliced optical fibers 116 may be cooled to yield a solid thermoplastic overcoating that extends over the previously stripped sections 112A, 112B, the splice region 114, and portions of the first and second pluralities of optical fiber segments 110A, 110B that were previously unstripped. In certain embodiments, the solid thermoplastic overcoating may comprise a melt-flow thermoplastic adhesive material, such as TECHNOMELT® PA 6208 polyamide material (Henkel Corp., Dusseldorf, Germany). Such material exhibits a heat resistance temperature greater than 90° C., a melt flow temperature lower than 260° C., a melt viscosity between 100 cps and 10,000 cps, and a hardness of at least Shore A 45. Further details regarding thermoplastic overcoating of fusion spliced optical fibers and/or portions of fiber optic cable assemblies are disclosed in International Publication No. WO 2018/175122 published on Sep. 27, 2018, wherein the content of the foregoing publication is hereby incorporated by reference herein.

Although not specifically shown in FIGS. 9A and 9B, it is to be appreciated that the heating apparatus 132 and pool of molten thermoplastic material 130 may also be used to form bundled sections of strength members, by contacting strength members with the molten thermoplastic material, then removing the strength members to permit the thermoplastic material to cool and solidify. Another apparatus suitable for coating multiple fusion spliced optical fibers and for separately coating strength members will be described infra, in connection with FIGS. 13A and 13B. Before discussing that apparatus, however, other items including bonding of loose fibers with flexible polymer adhesives, and formation of non-coplanar arrangements of fusion spliced optical fibers, will be introduced.

In certain embodiments, loose optical fibers (which may embody unjacketed portions of optical fibers emanating from a jacket of a fiber optic cable) may be bonded by flexible polymer adhesives before being processed by coating, stripping, cleaving, and mass fusion splicing, with such bonding being useful to provide dimensional stability of the fibers during subsequent processing steps such as polymeric material overcoating/encapsulation as well as positioning of optical fiber groups into a configuration other than a one-dimensional array. In such an embodiment, at least portions of flexible polymer adhesive material may be overcoated with polymeric material during one or more steps of polymeric material overcoating or encapsulation. In one embodiment involving a first group of loose, pre-coated (i.e., acrylate coated) optical fibers, the first group of optical fibers may be flexibly adhered into a first one-dimensional flexible fiber array having a length of at least about 60 mm. Thereafter, coating material may be stripped from ends of the first group of pre-coated optical fibers, and stripped ends of the first group of pre-coated optical fibers may be cleaved to form stripped sections of optical fibers suitable for fusion splicing. If the first group of optical fibers is to be fusion spliced to a second group of loose, pre-coated optical fibers, then the second group of optical fibers may be flexibly adhered into a second one-dimensional flexible fiber array having a length of at least about 60 mm. Thereafter, coating material may be stripped from ends of the second group of pre-coated optical fibers, and stripped ends of the second group of pre-coated optical fibers may be cleaved to form stripped sections of optical fibers also suitable for fusion splicing.

Figure 10A:
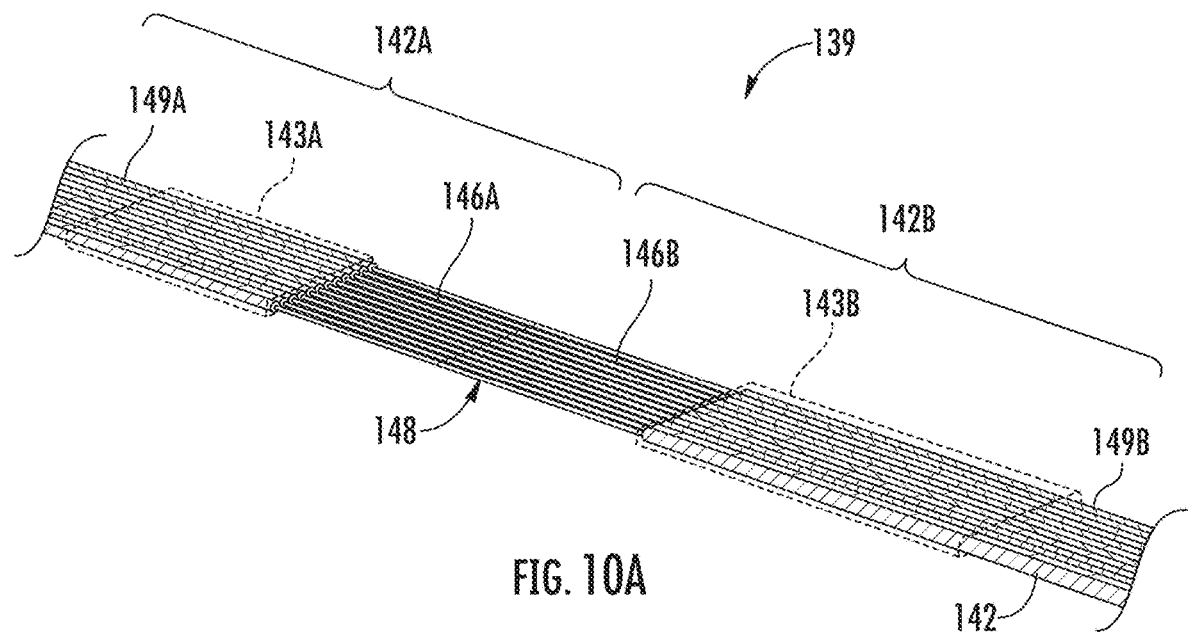
FIG. 10A is a perspective view of a portion of a fiber optic cable subassembly during fabrication, showing a one-dimensional array of twelve fusion spliced optical fibers, following adhesive binding of pre-coated sections of the fusion spliced optical fibers to maintain positioning of optical fibers in preparation for thermoplastic overcoating.

FIG. 10A is a perspective view of a portion of a fiber optic cable subassembly 139 during fabrication, with twelve fusion spliced optical fibers 142 arranged in a one-dimensional array, and being devoid of overcoating material over stripped portions 146A, 146B of the fusion spliced optical fibers 142. The fusion spliced optical fibers 142 include first and second pluralities of fiber optic segments 142A, 142B that each include a pre-coated section 149A, 149B and a stripped portion 146A, 146B, with ends of the stripped portions 146A, 146B being fusion spliced to one another at the fusion splice region 148. As shown, flexible polymer adhesive binding material regions 143A, 143B are provided over portions of the pre-coated sections 149A, 149B of the first and second pluralities of fiber optic segments 142A, 142B. In certain embodiments, flexible polymer adhesive binding material 143A, 143B may be used to flexibly adhere fiber optic segments of the first and second pluralities of fiber optic segments 142A, 142B prior to stripping of acrylate coating material from ends of the fiber optic segments 142A, 142B, and prior to cleaving of stripped ends of fiber optic segments 142A, 142B. At least portions of flexible polymer adhesive binding material regions 143A, 143B are subject to being subsequently overcoated with polymeric material during overcoating of the stripped portions 146A, 146B and the fusion splice region 148.

Figure 10B:
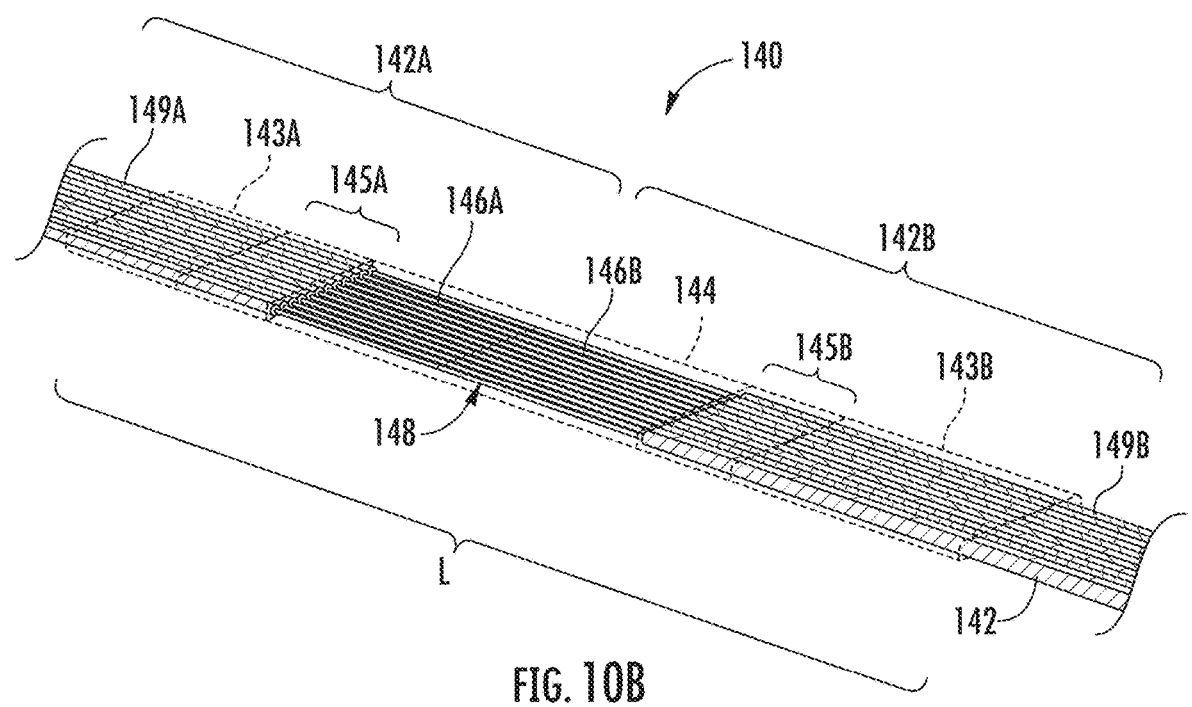
FIG. 10B is a perspective view of a fiber portion of a fiber optic cable assembly incorporating the subassembly of FIG. 10A, following addition of polymeric overcoating material that extends over stripped sections of the fusion spliced optical fibers, the splice region, and portions of the adhesively bound pre-coated sections.

FIG. 10B illustrates an optical fiber portion of a fiber optic cable assembly 140 incorporating the subassembly of FIG. 10A, following formation of a polymeric overcoating 144 extending over the stripped portions 146A, 146B and the fusion splice region 148. The polymeric overcoating 144 further extends over portions of the flexible polymer adhesive binding material regions 143A, 143B to form polymeric material overlap regions 145A, 145B. In certain embodiments, a length of each polymeric material overlap region 145A, 145B is at least about 3 mm in a direction parallel to fiber cores of the fusion spliced optical fibers 142. The remaining elements of FIG. 10B are identical to those described in FIG. 10A, and will not be described again for sake of brevity. It is to be appreciated that FIGS. 10A and 10B illustrate only optical fiber portions of a fiber optic cable assembly, without showing bundled sections of strength members and jackets as included in embodiments described herein.

In certain embodiments, a plurality of fusion spliced optical fibers have a non-coplanar arrangement at the fusion splice region of a fiber optic cable assembly, to provide a reduced aggregate width of the plurality of fusion spliced optical fibers. A "non-coplanar arrangement" in the fusion splice region is an arrangement in which the optical fibers of a plurality of fusion spliced optical fibers are not exclusively aligned (or exclusively substantially aligned) in a common plane that extends in a lengthwise direction of the fiber optic cable. In other words, there is no common plane, extending in a lengthwise direction of the fiber optic cable, that intersects all fusion spliced optical fibers at the fusion splice region (i.e., no substantial alignment in a common plane); or more specifically, there is no common plane, extending in a lengthwise direction of the fiber optic cable, that intersects a fiber core or each of the fusion spliced optical fibers at the fusion spliced region (i.e., no alignment in a common plane). Thus, "substantial alignment" refers to the fusion spliced optical fibers in general, whereas "alignment" is more precise and refers to fiber cores of the fusion spliced optical fibers. As can be appreciated, due to the non-coplanar arrangement at the fusion splice region, the fusion spliced optical fibers are not exclusively arranged in a one-dimensional array in a cross-sectional view perpendicular to the lengthwise direction of the fiber optic cable. Such an arrangement does not preclude the presence of two or more groups of fusion spliced optical fibers arranged in different one-dimensional arrays that in combination form a multi-dimensional array, so long as all fusion spliced optical fibers of the plurality of fusion spliced optical fibers are not arranged in a single one-dimensional array. The non-coplanar arrangement of fusion spliced optical fibers can be expressed by considering there to be multiple groups of the fusion spliced optical fibers, still with a polymeric overcoating extending over a fusion splice region as well as over a stripped section of each optical fiber segment. To this end, in certain embodiments, a first group of fusion spliced optical fibers is arranged non-coplanar to a second group of the fusion spliced optical fibers at the fusion splice region.

As noted previously, current mass fusion splice technology and current fusion splice protection technology only support one-dimensional arrays of optical fiber splices. Fiber optic cable assemblies according to certain embodiments disclosed herein may include mass fusion spliced optical fibers that are repositioned (after fusion splicing is completed) to a configuration other than a one-dimensional array, and overcoated or encapsulated with polymeric material.

In certain embodiments, during fabrication of a fiber optic cable assembly, mass fusion spliced first and second pluralities of optical fiber segments may be initially arranged in a one-dimensional array to form a plurality of fusion spliced optical fibers. Thereafter, stripped sections of the fusion spliced optical fibers may be contacted with polymeric material in a flowable state. Either before or after the contacting of stripped sections with flowable (e.g., molten) polymeric material, the position of at least some of the fusion spliced optical fibers may be rearranged to yield a configuration in which the fusion spliced optical fibers have a non-coplanar arrangement at the fusion splice region. Thereafter, the polymeric material may be solidified with the fusion spliced optical fibers in the non-coplanar arrangement at the fusion splice region.

In certain embodiments, solidified polymeric material forms a polymeric overcoating that encapsulates the fusion splice region and the stripped sections of each optical fiber segment of the plurality of fusion spliced optical fibers. Such overcoating may also extend over a portion of a pre-coated (unstripped) section of each optical fiber.

The altering of position of at least some of the fusion spliced optical fibers to yield a configuration in which the plurality of fusion spliced optical fibers have a non-coplanar arrangement at the fusion splice region may be performed either before or after the fusion spliced optical fibers are contacted with polymeric material in a flowable state. In certain embodiments, the contacting of the fusion splices as well as at least a portion of the stripped sections of the fusion spliced optical fibers with a polymeric material in a flowable state is performed prior to the altering of position of at least some fusion spliced optical fibers. Conversely, in certain embodiments, the contacting of the fusion splices as well as at least a portion of the stripped sections of the fusion spliced optical fibers with a polymeric material in a flowable state is performed after the altering of position of at least some fusion spliced optical fibers. In certain embodiments, the contacting of at least a portion of the stripped sections with polymeric material in a flowable state comprises (i) coating at least a portion of the stripped sections with a first portion of polymeric material prior to the altering of position of at least some fusion spliced optical fibers; and (ii) coating at least a portion of the stripped sections with a second portion of polymeric material prior to the altering of position of at least some fusion spliced optical fibers. In certain embodiments, the first portion of polymeric material may be compositionally the same as the second portion of polymeric material, or the first and second portions of polymeric material may be compositionally different.

Various methods may be used to solidify polymeric material in a flowable state, depending on the character of the polymeric material. In certain embodiments, polymeric material may be solidified by supplying a chemical (e.g., a polymerization agent, which may optionally include water) to promote cross-linking between polymer chains. In certain embodiments, solidifying of the polymeric material may be accomplished by cooling the polymeric material. In certain embodiments, the contacting of at least a portion of the stripped section of each optical fiber segment of the plurality of fusion spliced optical fibers with the polymeric material in a flowable state is performed prior to the altering of position of at least some fusion spliced optical fibers, and the altering of position of at least some fusion spliced optical fibers is performed while the polymeric material in a flowable state is maintained at a melt flow temperature of the polymeric material.

In certain embodiments, polymeric material may be in a flowable state when initially contacted with stripped sections of optical fiber segments and fusion splices, at least partially solidified, and subsequently reflowed and resolidified. In certain embodiments, the contacting of at least a portion of the stripped sections of each optical fiber segment of the plurality of fusion spliced optical fibers with the polymeric material in a flowable state comprises coating the stripped sections with the polymeric material in a flowable state, and the contacting is performed prior to the altering of position of at least some fusion spliced optical fibers of the plurality of fusion spliced optical fibers. Thereafter, the altering of position of at least some fusion spliced optical fibers of the plurality of fusion spliced optical fibers comprises stacking a first group of fusion spliced optical fibers of the plurality of fusion spliced optical fibers over a second group of fusion spliced optical fibers of the plurality of fusion spliced optical fibers with polymeric material (coated on the stripped sections during the contacting step) arranged therebetween. In such a case, the polymeric material may be reheated after the altering of position of at least some fusion spliced optical fibers of the plurality of fusion spliced optical fibers to reflow and merge polymeric material arranged between (i) the first group of fusion spliced optical fibers and (ii) the second group of fusion spliced optical fibers.

In certain embodiments, the contacting at least a portion of the stripped sections of the fusion spliced optical fibers with polymeric material in a flowable state may include coating at least a portion of the stripped sections with a first portion of polymeric material prior to the altering of position of at least some spliced optical fibers of the plurality of fusion spliced optical fibers, and coating at least a portion of the stripped sections with a second portion of polymeric material in a flowable state after the altering of position of at least some spliced optical fibers of the plurality of fusion spliced optical fibers. Restated, such a method may include an initial polymeric material contacting step, followed by positioning of groups of fusion spliced optical fibers into a configuration other than a one-dimensional array, followed by a subsequent polymeric material contacting step.

Any reference herein to non-coplanar first and second groups of fusion spliced optical fibers is neither intended to limit, nor serves to limit, the subject matter disclosed herein to fusion spliced optical fibers with fiber cores disposed in first and second planes such as a "two row" array. Any suitable configuration for arranging multiple groups of fusion spliced optical fibers, other than exclusively in a one-dimensional array, is contemplated by such language. In certain embodiments, a third group of fusion spliced optical fibers may be further provided, wherein at the fusion splice region, a third plane is definable through substantially parallel fiber cores of at least two optical fibers of the third group of fusion spliced optical fibers, with the first, second, and third planes being non-coplanar. In certain embodiments involving a total of twelve fusion spliced optical fibers, the fusion splice region may be configured as a 2×6 array, a 3×4 array, or a hexagonal close packed four-layer configuration, respectively. In certain embodiments, fusion spliced optical fibers may be placed in a spiral configuration so long as the fusion spliced optical fibers remain substantially parallel to one another (e.g., within one degree or within two degrees of deviation from parallel at any one position). Other configurations may be provided for groups of twelve fusion spliced fibers or for groups of fusion spliced fibers other than twelve in number. In certain embodiments, each group of optical fiber segments to be spliced may include 8, 12, 16, or 24 optical fibers. Other numbers of optical fibers may be provided. In certain embodiments, non-coplanar first and second groups of fusion spliced optical fibers each include at least three, or at least four, fusion spliced optical fibers. Such optical fibers may include single mode optical fibers or multi-mode optical fibers.

Various methods may be used to alter position of at least some fusion spliced optical fibers. In certain embodiments, mass fusion spliced fibers may be overcoated with thermoplastic material and separated into a number of subarrays each including multiple coated optical fibers. The subarrays are then stacked in a fixture, and polymer coated splice regions are heated above the melt flow temperature of the thermoplastic material and subsequently cooled. Such process causes the thermoplastic overcoating between the subarrays to coalesce and form an encapsulated two-dimensional high density encapsulated splice.

In certain embodiments, the altering of position of at least some spliced optical fibers of a plurality of fusion spliced optical fibers includes rolling the at least some spliced optical fibers in a direction perpendicular to fiber cores of the spliced optical fibers. Such a step may be useful for forming an overcoated fiber optic cable portion having a cross-section in a hexagonal close-packed configuration. In certain embodiments, such rolling may be combined with twisting to form an overcoated fiber optic cable portion having optical fibers arranged in a spiral configuration.

In certain embodiments, the altering of position of at least some spliced optical fibers of a plurality of fusion spliced optical fibers includes folding of a first group fusion spliced optical fibers (e.g., in a direction perpendicular to fiber cores of fusion spliced optical fibers) in a manner causing the first group of fusion spliced optical fibers to overlie the second group of fusion spliced optical fibers. Such a step may be useful for forming an overcoated fiber optic cable portion having a cross-section with a rectangular shape. As an alternative to folding, in certain embodiments the altering of position of at least some spliced optical fibers of a plurality of fusion spliced optical fibers may include stacking a first group of fusion spliced optical fibers over a second group of fusion spliced optical fibers.

Figure 11A:
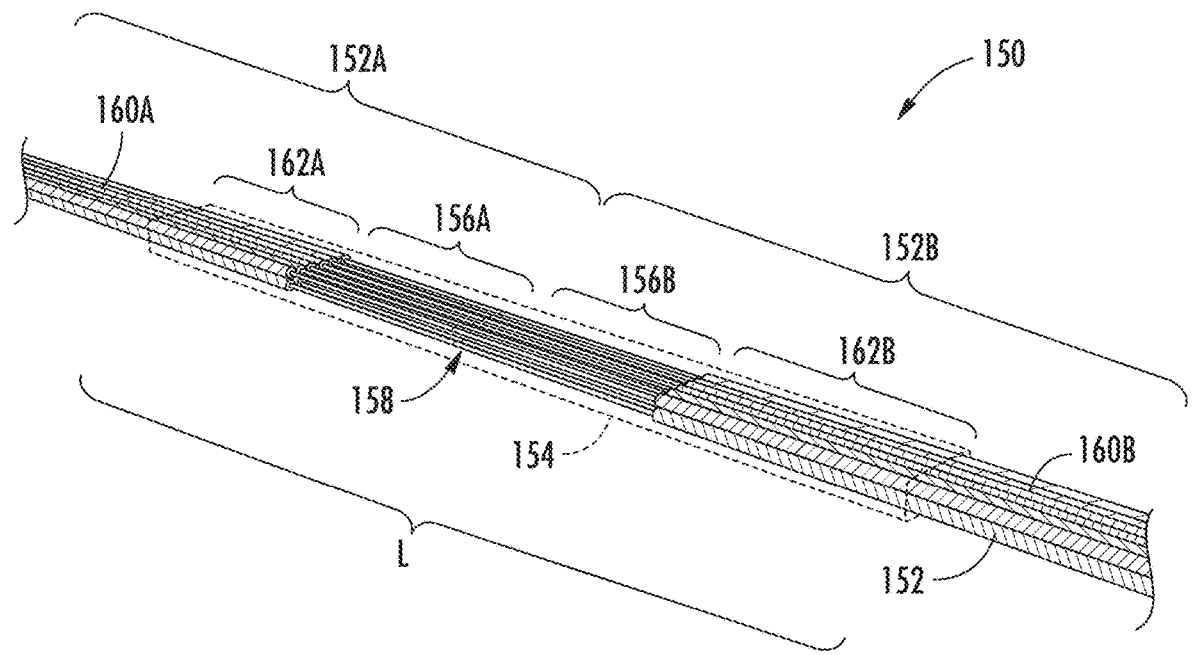
FIG. 11A is a perspective view of a portion of a fiber optic cable with non-coplanar groups of fusion spliced optical fibers that form a 2×6 array, and overcoating material that extends over stripped sections of the fusion spliced optical fibers and the splice region.
Figure 11B:
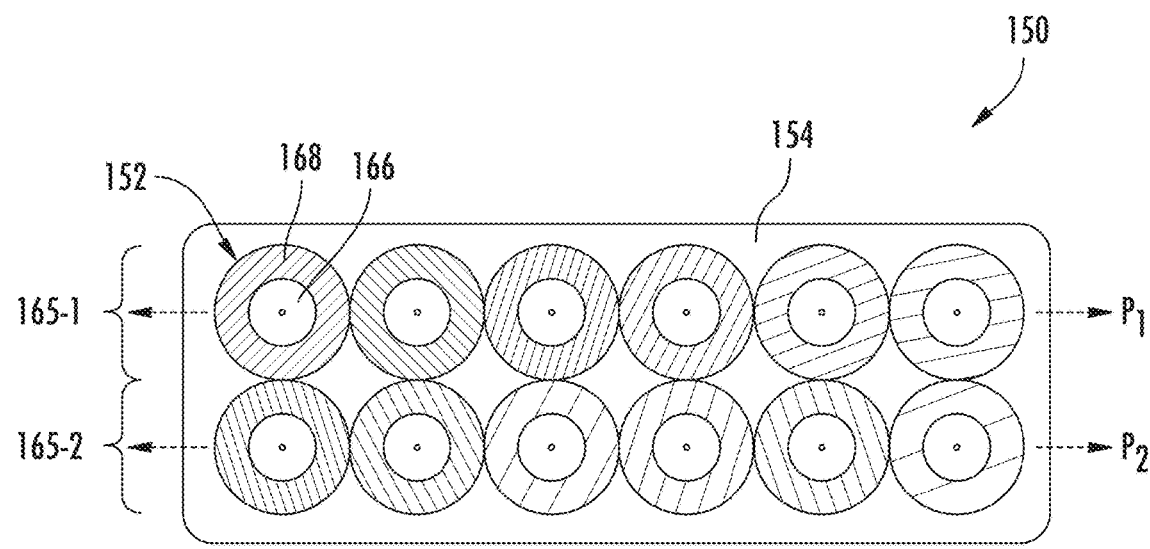
FIG. 11B is a cross-sectional view of the fiber optic cable of FIG. 11A.

FIGS. 11A and 11B provide perspective and cross-sectional views, respectively, of a fiber optic cable 150 with twelve fusion spliced optical fibers 152 arranged in a 2×6 array, and overcoating material 154 that extends over stripped sections 156A, 156B of the fusion spliced optical fibers 152 and over a fusion splice region 158. The fusion spliced optical fibers 152 include first and second pluralities of fiber optic segments 152A, 152B that each include a pre-coated section 160A, 160B and a stripped section 156A, 156B, with ends of the stripped sections 156A, 156B being fusion spliced to one another at the fusion splice region 158. The overcoating material 154 has a length L sufficient to cover not only the stripped sections 156A, 156B and the fusion splice region 158, but also portions of the pre-coated sections 160A, 160B of the fusion spliced optical fibers 152 to form overlap regions 162A, 162B. FIG. 11B provides a cross-sectional view taken through one of these overlap regions 162A. Referring to FIG. 11B, in the overlap region 162A, each fusion spliced optical fiber 152 includes a glass core, glass cladding 166, and an acrylate coating 168. As shown, the acrylate coating 168 of each optical fiber 152 may be arranged in contact with an acrylate coating of at least one other optical fiber within the 2×6 array; however, in the stripped sections 156A, 156B of FIG. 11A, the stripped (glass) sections 156A, 156B are arranged in parallel without contacting one another, and the overcoating material 154 directly contacts glass material (i.e., cladding material 166 as shown in FIG. 9B) of the stripped sections 156A, 156B. With continued reference to FIG. 11B, the array of optical fibers 152 may be segregated in two optical fiber groups 165-1, 165-2. Within each optical fiber group 165-1, 165-2, a plane $P_1$, $P_2$, is definable through glass cores of at least two (or as illustrated, six) optical fibers of that group. As shown, the two planes $P_1$, $P_2$ are non-coplanar. The 2×6 array configuration of fusion spliced optical fibers 152 shown in FIGS. 11A and 11B is significantly narrower than a width that would result from arranging the twelve fusion spliced optical fibers 152 in a 1×12 array (although not as narrow as a 3×4 array configuration to be discussed in connection with FIG. 14). The fusion spliced optical fibers 152 shown in FIGS. 11A and 11B is amenable to being positioned in the depicted 2×6 array configuration by two-layer folding, which is simpler than forming a three-layer array (e.g., 3×4 array) or four-layer array (e.g., hexagonal packed array) as disclosed herein. In certain embodiments, the maximum cross-sectional dimension of an encapsulated area of the fiber optic cable 150 (e.g., corresponding to one of the overlap regions 162A, 162B) is 1.67 mm, which enables the fiber optic cable 150 to fit into a 3 mm outer diameter cable jacket.

Figure 12:
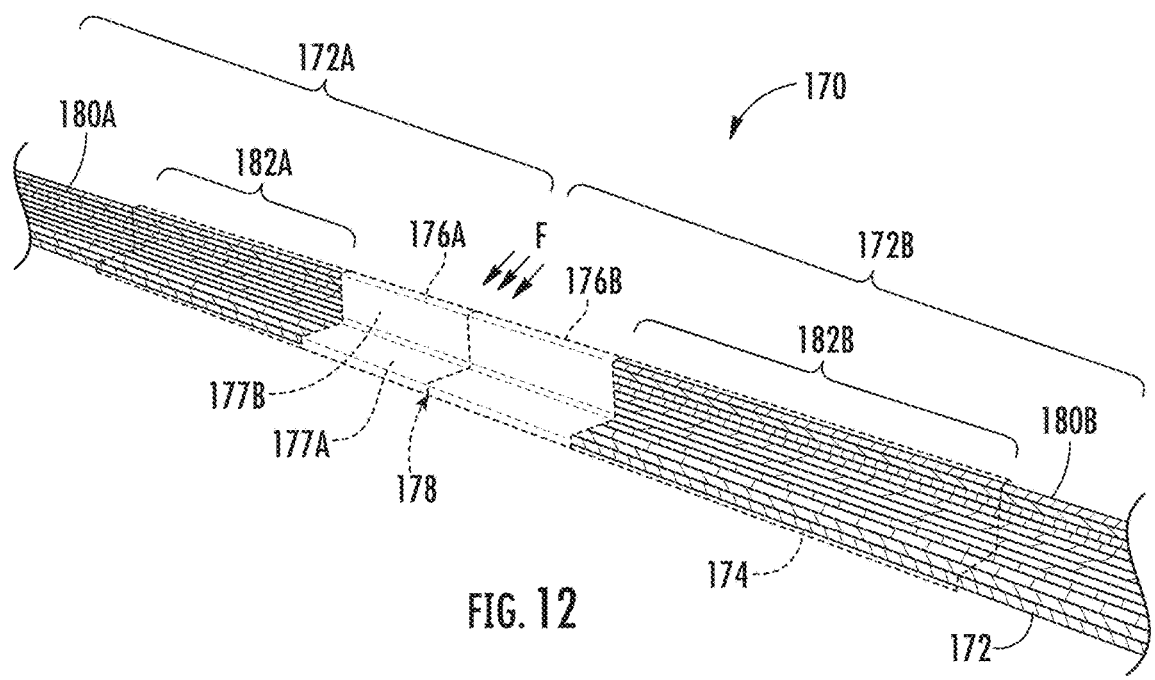
FIG. 12 is a perspective view of a portion of a fiber optic cable subassembly during fabrication, showing a two-dimensional array of multiple fusion spliced optical fibers in a process of being formed by rolling in a direction perpendicular to cores of the fusion spliced optical fibers.

FIG. 12 is a perspective view of a portion of a fiber optic cable subassembly 170 during fabrication, showing an overcoated second group of fusion spliced optical fibers 177B in a state of being folded, with the intention of subsequently being positioned to overlap an overcoated first group of fusion spliced optical fibers 177A. The fusion spliced optical fibers encompass first and second pluralities of fiber optic segments 182A, 18B that each include a pre-coated section 180A, 180B and a stripped section 176A, 176B, with ends of the stripped sections 176A, 176B being fusion spliced to one another at the fusion splice region 178. Overcoating material 174 extends over the stripped sections 176A, 176B, over the fusion splice region 178, and over portions of the pre-coated sections 180A, 180B to form overlap regions 182A, 182B. As shown, a second group of overcoated fusion spliced optical fibers 177B is vertically oriented and extends higher than a first group of horizontally arranged overcoated fusion spliced optical fibers 177A. With continued folding of the second group of overcoated fusion spliced optical fibers 177B by application of the folding force F, the second group of overcoated fusion spliced optical fibers 177B may be stacked atop the first group of overcoated fusion spliced optical fibers 177A. If the overcoating material 174 embodies thermoplastic material, then in certain embodiments, reheating of the overcoating material 174 may cause reflow of the overcoating material 174 between the first and second groups of overcoated fusion spliced optical fibers 177A, 177B sufficient to adhere these groups together after cooling of the overcoating material 174.

Figure 13A:
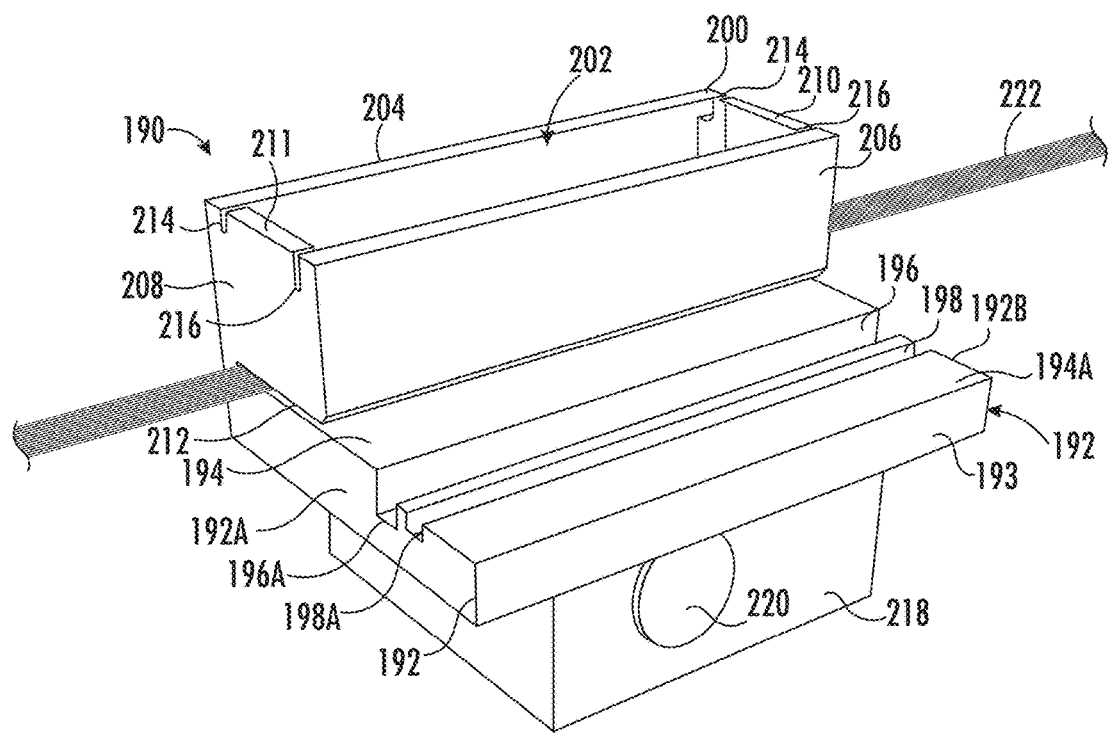
FIG. 13A is a perspective view of an apparatus for applying a thermoplastic coating over components of a fiber optic cable assembly, the apparatus including a trough for containing molten thermoplastic material arranged above a heated working surface, with a lateral insertion slot bounded in part by the working surface in fluid communication with the trough cavity and a portion of such a fiber optic cable assembly received in the lateral insertion slot.
Figure 13B:
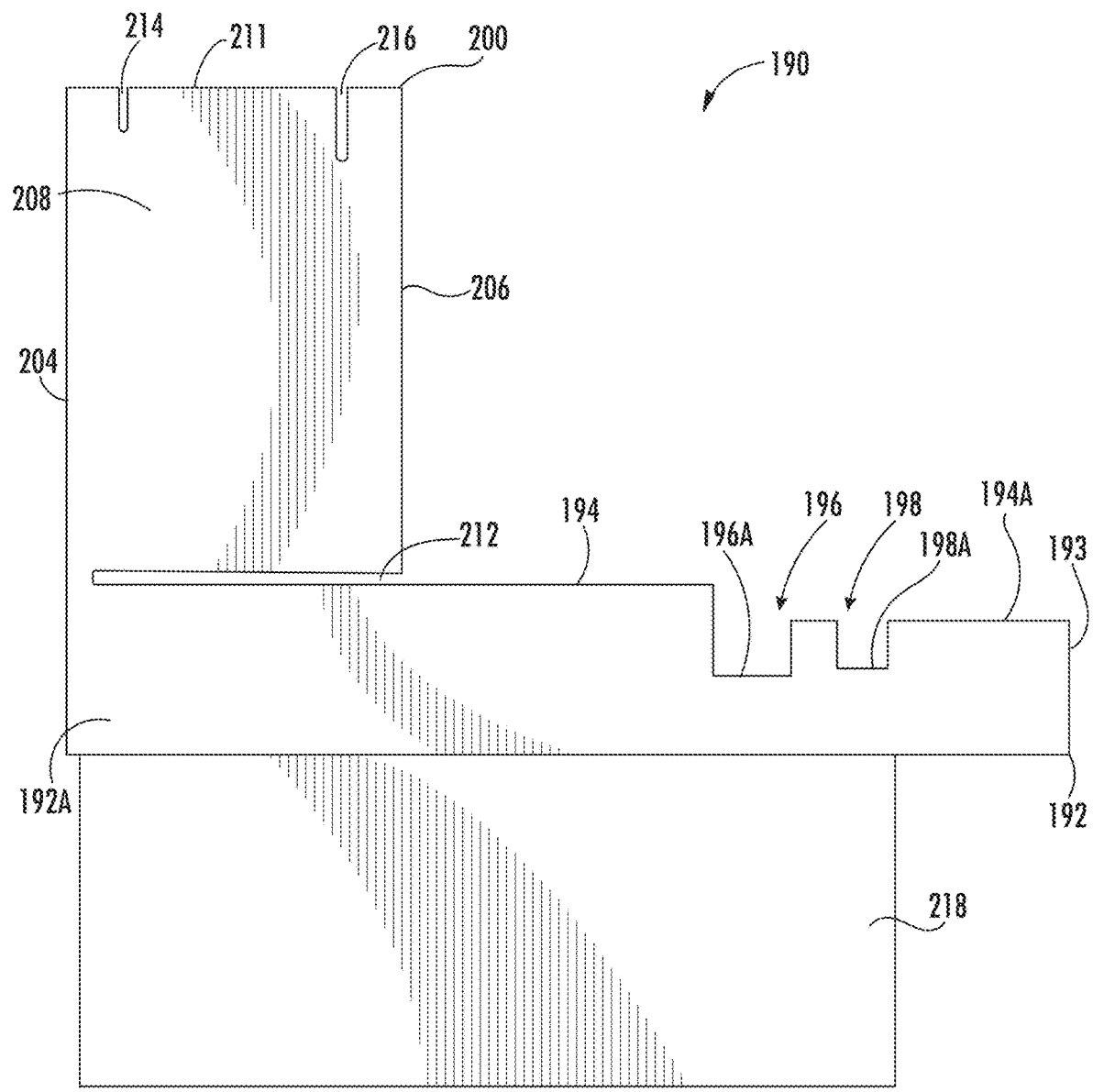
FIG. 13B is a side elevation view of one end of the apparatus of FIG. 13A

FIGS. 13A and 13B illustrate of an apparatus 190 useful for: (i) applying a thermoplastic coating over components of a fiber optic cable assembly (such as over fusion spliced optical fibers and over groups of strength members to form bundled sections of strength members), (ii) altering position of fusion spliced optical fibers to yield non-coplanar arrangement at the fusion splice region, and (iii) promoting adhesion between overlapping bundled sections of strength members.

The apparatus 190 includes a support member 192 defining a working surface 194 with first and second longitudinal recesses 196, 198 defined in the support member 192 and each having a floor 196A, 196B that is recessed relative to the working surface 194. The support member 192 is bounded laterally by left and right side surfaces 192A, 192B and a front surface 193, wherein the longitudinal recesses 196, 198 extend over an entire width of the support member 192 to penetrate the left and right side surfaces 192A, 192B. As shown, the first and second longitudinal recesses 196, 198 each have a constant width in a direction perpendicular to the front surface 193, but a width and depth dimensions of the first and second longitudinal recesses 196, 198 differ from one another. A front working surface portion 194A may be arranged lower than a remainder of the working surface 194.

The apparatus 190 further includes a trough 200 arranged above the working surface 194 and defining a trough cavity 202 configured to retain a pool of molten thermoplastic material. The trough 200 is bounded by a rear wall 204, a front wall 206, side walls 208, 210, and a portion of the working surface 194. A lateral insertion slot 212 extends between the working surface 194 and the front wall 206 of the trough 200, and further extends between the working surface 194 and at least portions of the side walls 208, 210, with the lateral insertion slot 212 not extending through the rear wall 204. The lateral insertion slot 212 is provided in fluid communication with the trough cavity 202. Despite the presence of the lateral insertion slot 212 providing an opening to the trough cavity 202, molten thermoplastic material may remain substantially within the trough cavity 202 without escaping through the lateral insertion slot 212 due to lower temperature at external portions of the lateral insertion slot 212 in contact with ambient air, in combination with surface tension of the molten thermoplastic material. In certain embodiments, the lateral insertion slot 212 includes a height of about 0.33 mm.

Opposing pairs of vertical slots 214, 216 extend downward from an upper surface 211 of the side walls 208, 210 of the trough 200. A body structure 218 arranged below the support member 192 contains a heating element 220, which may embody a resistive heating element such as a resistive cartridge heater, and may include an associated temperature sensor (e.g., thermocouple, thermistor, or the like) to permit temperature to be controlled. As shown, the body structure 218 may have lateral dimensions smaller than the support member 192. The body structure 218 is configured to transfer heat from the heating element 220 to the support member 192 and the working surface 194 by thermal conduction. As shown in FIG. 13A, a fiber optic cable assembly portion 222 (e.g., including multiple optical fibers arranged in a linear array such as a ribbon) is received by the lateral insertion slot 212.

During use of the apparatus 190, spliced optical fibers (such as embodied in the fiber optic cable assembly portion 222) may be slid laterally into the lateral insertion slot 212 to be coated by molten thermoplastic material, and after sliding out, the thickness of the thermoplastic material coating is set by the thickness (i.e., height) of the lateral insertion slot 212. To ribbonize loose optical fibers, the optical fibers may first be sorted into a one-dimensional array and then slid laterally into the lateral insertion slot 212. The optical fibers may then be pulled longitudinally through the bath of molten thermoplastic material, wherein a thickness of a resulting fiber ribbon is again determined by the thickness of the lateral insertion slot 212. The same apparatus 190 may be used for binding strength members into bundled sections. In one embodiment, strength members such as Kevlar aramid yarn fibers are first held by a clip with a predetermined width. The strength members are then slid laterally into the lateral insertion slot 212 to contact molten thermoplastic material retained in the trough cavity 202. The strength members soaked with molten thermoplastic material can be slid out of the trough cavity in either a longitudinal or lateral direction, wherein after cooling a bundled section of strength members is formed. The thickness of the resulting bundled section of strength members is again set by the thickness of the lateral insertion slot 212.

Other features of the apparatus 190 are beneficial for producing fiber optic cable assemblies as disclosed herein. In certain embodiments, the longitudinal recesses 196, 198 defined in the support member 192 may be used to promote formation of encapsulated optical fiber arrays having non-coplanar groups of fusion splice optical fibers. Following removal of a thermoplastically coated one-dimensional array of fusion spliced optical fibers from the lateral insertion slot 212, such an array may be positioned over one of the longitudinal recesses 196, 198 of desired size and folded (or rolled) therein to reposition at least some of the fusion spliced optical fibers in a two-dimensional array. Additionally, the working surface 194 may be used to effectuate heating and reflow of binding material of overlapping bundled sections of strength members to adhere the bundled sections to one another.

In certain embodiments, the apparatus 190 may be fabricated of one or more suitably thermally conductive materials such as aluminum, stainless steel, or the like. In certain embodiments, one or more surfaces (or surface portions) of the apparatus may be anodized and/or coated with a non-stick material.

Figure 14:
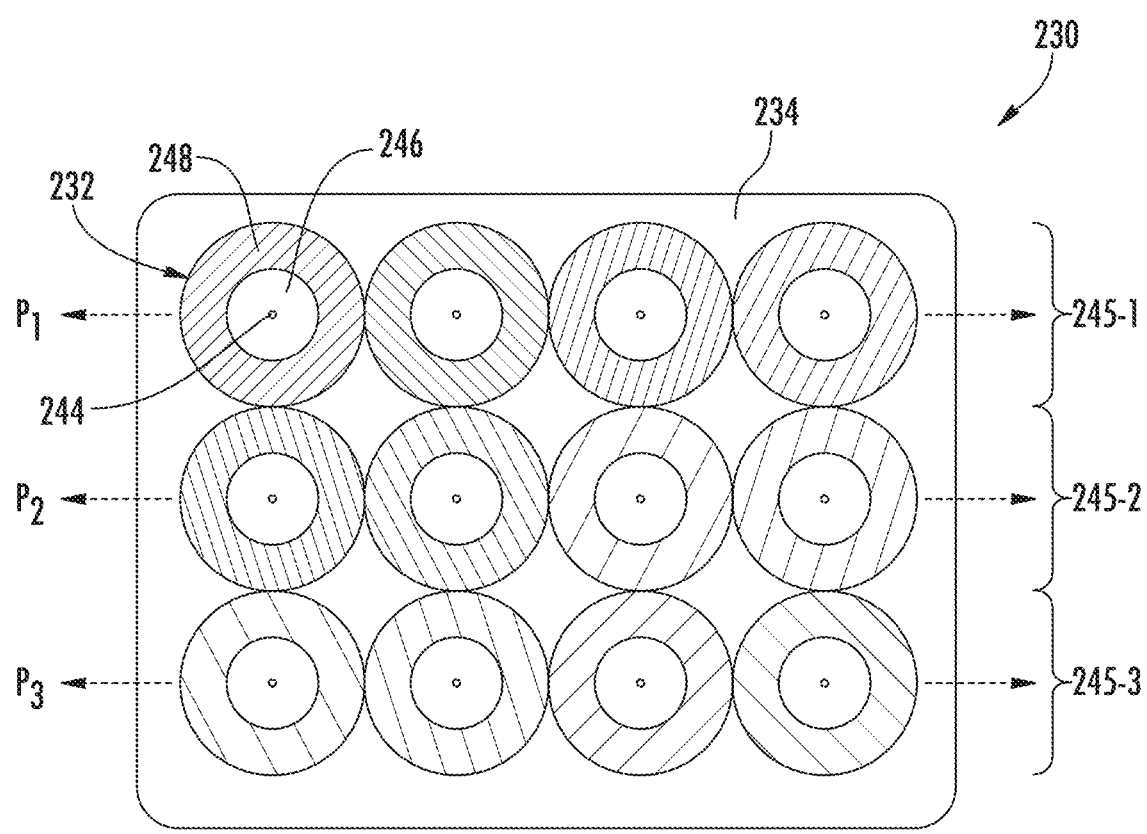
FIG. 14 is a cross-sectional view of an encapsulated optical fiber array of a fiber optic cable with non-coplanar groups of fusion spliced optical fibers that form a 3×4 array.

FIG. 14 is a cross-sectional view of an encapsulated optical fiber array 230 of a fiber optic cable showing twelve fusion spliced optical fibers 232 arranged in a 3×4 array, and overcoating material 234 that extends over the fusion spliced optical fibers 232. Unstripped portions of the fusion spliced optical fibers 232 (e.g., distal from a fusion splice region) are shown, with each fusion spliced optical fiber 232 including a glass core 244, glass cladding 246, and an acrylate coating 248. As illustrated, the acrylate coating 248 of each optical fiber 232 may be arranged in contact with an acrylate coating 248 of at least one other optical fiber 232 within the 3×4 array in unstripped optical fiber regions of the encapsulated optical fiber array 230. It is to be appreciated that in stripped portions of optical fibers (not shown) of the encapsulated optical fiber array 230, the overcoating material 234 may directly contact glass cladding 246 of the fusion spliced optical fibers 232. With continued reference to FIG. 14, the array of fusion spliced optical fibers 232 may be segregated in three optical fiber groups 245-1, 245-2, 245-3. Within each optical fiber group 245-1, 245-2, 245-3, a plane $P_1$, $P_2$, $P_3$ is definable through glass cores 244 of at least two (or as illustrated, three) optical fibers of that group. As shown, the three planes $P_1$, $P_2$, $P_3$ are non-coplanar. The 3×4 array configuration of fusion spliced optical fibers 232 shown in FIG. 14 is significantly narrower than a width that would result from arranging the twelve fusion spliced optical fibers 232 in a one dimensional (i.e., 1×12) array. In certain embodiments, the maximum cross-sectional dimension (e.g., maximum width) of an encapsulated area of the optical fiber array 230 is within a diameter of 1.3 mm, which enables the optical fiber array 230 of the fiber optic cable to easily fit into the 1.5 mm inner diameter of a 2 mm outer diameter cable jacket. This dimension is significantly reduced in comparison to the 3.1 mm width of a standard optical fiber ribbon containing twelve optical fibers.

Figure 15:
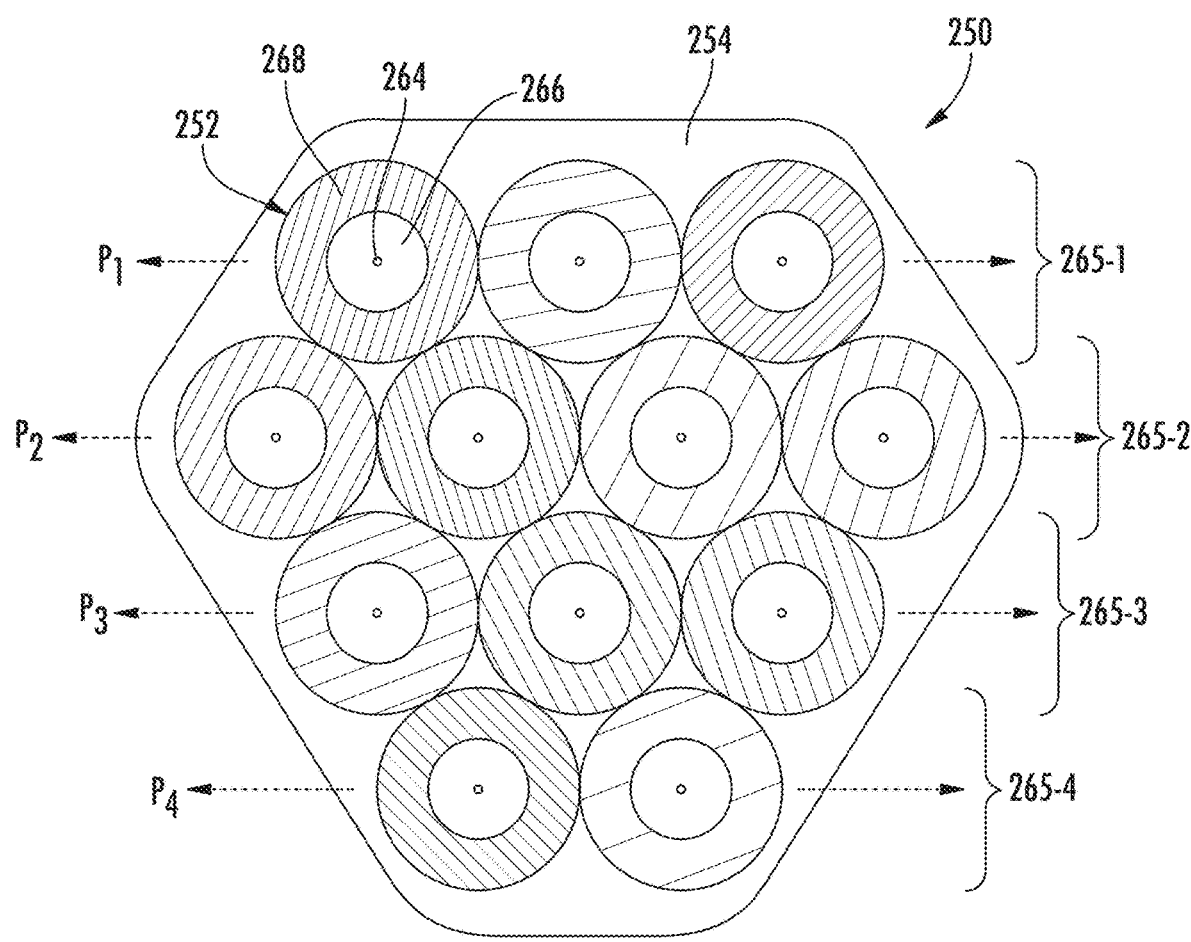
FIG. 15 is a cross-sectional view of a portion of a fiber optic cable with non-coplanar groups of fusion spliced optical fibers that form a hexagonal close packed four-layer configuration.

FIG. 15 is a cross-sectional view of an encapsulated optical fiber array 250 of a fiber optic cable with twelve fusion spliced optical fibers 252 arranged in a hexagonal close packed four-layer configuration, and overcoating material 254 that extends over the fusion spliced optical fibers 252. Unstripped portions of the fusion spliced optical fibers 232 (e.g., distal from a fusion splice region) are shown, with each fusion spliced optical fibers 252 including a glass core 264, glass cladding 266, and an acrylate coating 268. As shown, the acrylate coating 268 of each optical fiber 252 may be arranged in contact with an acrylate coating 268 of at least one other optical fiber 252 within the hexagonal close packed four-layer configuration in unstripped optical fiber regions of the encapsulated optical fiber array 250, whereas in cross-sections of the encapsulated optical fiber array corresponding to stripped portions of optical fibers (not shown), the overcoating material 254 may directly contact the glass cladding 268 of the fusion spliced optical fibers 252. With continued reference to FIG. 15, the hexagonal close packed four-layer configuration of optical fibers 252 may be segregated in four optical fiber groups 265-1, 265-2, 265-3, 265-4. Within each optical fiber group 265-1, 265-2, 265-3, 265-4, a plane $P_1$, $P_2$, $P_3$, $P_4$ is definable through glass cores 264 of at least two (or as illustrated, three or four in certain instances) optical fibers of that group. As shown, the four planes $P_1$, $P_2$, $P_3$, $P_4$ are non-coplanar. The hexagonal close packed four-layer configuration of fusion spliced optical fibers 252 shown in FIG. 15 is significantly narrower than a width that would result from arranging the twelve fusion spliced optical fibers 252 in a 1×12 array, and also narrower than the 2×6 and 3×4 array configurations shown in FIG. 11B and FIG. 14, respectively. In certain embodiments, the maximum cross-sectional dimension of an encapsulated area of the encapsulated fiber array 250 is 1.0 mm, which enables the encapsulated optical fiber array 150 to fit into a 3 mm outer diameter cable jacket.

It is to be appreciated that the encapsulated optical fiber arrays 230, 250 of FIGS. 14 and 15, respectively, may be incorporated into a fiber optical cable assembly including a jacket as well as overlapping, adhered bundled sections of strength members as disclosed previously herein.

EXAMPLE

An example demonstrating the fabrication of a fiber optic cable assembly incorporating fusion splices between two twelve-fiber trunk cables will now be described in connection with FIGS. 8A-8F. With reference to FIG. 8A, starting with a 3.0 mm outer diameter jacketed pigtail cable section 101 containing Kevlar strength members 108 and twelve optical fibers 110, a section of the cable jacket about 70 mm in length is removed or slit open to expose the optical fibers 110 and the Kevlar strength members 108. Following separation of the strength members 108 from the optical fibers 110, the apparatus 190 of FIGS. 13A and 13B is used (i) to ribbonize the unjacketed optical fibers 110 by inserting them laterally into the lateral insertion slot 212 to contact molten thermoplastic material, and (ii) to form a bundled section 109 of strength members 108 by inserting the strength members 108 laterally into the lateral insertion slot 212 to contact molten thermoplastic material. The apparatus 190 is used to form a bundled section 109 of Kevlar strength members 108 having dimensions of 30 mm long, 3 mm wide, and 0.33 mm thick. FIG. 8B shows a fiber optic cable section 100 including resulting bundled section 109 of strength members 108 and the ribbonized optical fibers 110. The foregoing process is performed twice to form identical first and second cable fiber optic sections 100A, 100B (shown in FIG. 8C), each in accordance with the fiber optic cable section 100 of FIG. 8B.

Starting with the first and second fiber optic cable sections 100A, 100B, end portions of the ribbonized optical fibers 110A, 110B are stripped, cleaved, fusion spliced at splice region 114, and then coated with a thin layer of hot melt adhesive as matrix protection material. The bundled sections 109A, 109B of Kevlar strength members are trimmed and oriented to the same side of the fiber splice. The result is shown in FIG. 8C.

Thereafter, the bundled sections 109A, 109B of Kevlar strength members are clamped in a stacked configuration (one on top of the other) while keeping the aggregate length of the stacked bundled sections 109A, 109B bundled slightly shorter than the fusion spliced optical fibers 116. The overlapped bundled sections 109A, 109B of Kevlar strength members are heated to about 200° C. to re-melt the hot melt adhesive previously applied to bind strength members of each bundled section 109A, 109B. After cooling in a few seconds, the bundled sections 109A, 109B of Kevlar strength members are bonded together. Because the protective coating of the ribbon fiber splice is thin, the fusion spliced optical fibers 116 and the overlapping bundled sections 109A, 109B of strength members are virtually parallel. The resulting uncovered fiber optic cable assembly 120' is shown in FIGS. 8D and 8E. Thereafter, a tubular covering member 126 embodied in a stainless steel tube may be slid laterally to cover the fusion spliced optical fibers 116 and the overlapping bundled sections 109A, 109B of strength members, and to overlap the jackets 102A, 102B of the first and second fiber optic cable sections 100. Short lengths of the split portions 104A, 104B (shown in FIGS. 8A-8D) of the jackets 102A, 102B are retained within the tubular covering member 126 to provide additional bonding surface area. Fast curing adhesive is applied to bond ends of the jackets 102A, 102B to the ends of the tubular covering member 126. The tubular covering member 126 completely encloses an intermediate cable section 124 including the fusion spliced optical fibers 116 as well as the overlapping and adhered bundled sections 109A, 109B of strength members.

Those skilled in the art will appreciate that various modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents. The claims as set forth below are incorporated into and constitute part of this detailed description.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred.

What is claimed is:

1. A method for fabricating a fiber optic cable assembly, the method comprising:
   processing a first cable section, including at least one first optical fiber and a plurality of first strength members within a first jacket, to bind an unjacketed segment of the plurality of first strength members into a first bundled section of the plurality of first strength members;
   processing a second cable section, including at least one second optical fiber and a plurality of second strength members within a second jacket, to bind an unjacketed segment of the plurality of second strength members into a second bundled section of the plurality of second strength members;
   fusion splicing ends of the at least one first optical fiber and the at least one second optical fiber to form at least one splice joint defining a splice region of the fiber optic cable assembly, wherein each of the at least one first optical fiber and the at least one second optical fiber comprises a stripped portion proximate to the at least one splice joint;
   forming a polymeric overcoating over the at least one splice joint and over the stripped portion of each of the at least one first optical fiber and the at least one second optical fiber; and
   positioning the first bundled section of the plurality of first strength members and the second bundled section of the plurality of second strength members in an overlapping arrangement, and adhering the overlapped first and second bundled sections to one another;
   wherein the fiber optic cable assembly is devoid of a heat shrink tube arranged over the at least one splice joint.

2. The method of claim 1, further comprising effecting relative movement between the at least one first optical fiber and the at least one second optical fiber to form at least one bowed optical fiber region including the at least one splice joint, and adhering the first and second bundled sections to one another while the at least one bowed optical fiber region is maintained.

3. The method according to claim 1, wherein:
the binding of the unjacketed segment of the plurality of first strength members comprises contacting the plurality of first strength members with at least one polymeric material in a flowable state and solidifying the at least one polymeric material to form the first bundled section;
the binding of the unjacketed segment of the plurality of second strength members comprises contacting the plurality of second strength members with the at least one polymeric material in a flowable state and solidifying the at least one polymeric material to form the second bundled section; and
the adhering of the overlapped first and second bundled sections to one another comprises heating the first and second bundled sections at or above a melting temperature of the at least one polymeric material, and re-solidifying the at least one polymeric material.

4. The method according to claim 1, wherein:
the processing of the first cable section comprises providing the unjacketed segment of the plurality of first strength members having a length exceeding a length of an unjacketed segment of the at least one first optical fiber extending beyond the first jacket toward the splice region; and
the processing of the second cable section comprises providing the unjacketed segment of the plurality of second strength members having a length exceeding a length of an unjacketed segment of the at least one second optical fiber extending beyond the second jacket toward the splice region.

5. The method according to claim 1, wherein the first strength members of the plurality of first strength members are generally aligned in a linear array in the first bundled section, and the second strength members of the plurality of second strength members are generally aligned in a linear array in the second bundled section.

6. The method according to claim 1, wherein:
a longitudinal axis is definable in a direction generally parallel to a core of the at least one first optical fiber and a core of the at least one second optical fiber at the splice region; and
the first and second bundled sections are arranged to one side of the longitudinal axis without being distributed around an entire circumference of the longitudinal axis.

7. The method according to claim 1, wherein the at least one first optical fiber in the first cable section comprises a plurality of first optical fibers, the at least one second optical fiber in the second cable section comprises a plurality of second optical fibers, and the method further comprises:
binding optical fibers of an unjacketed segment of the plurality of first optical fibers extending beyond the first jacket with at least one polymeric material to form a first optical fiber ribbon; and
binding optical fibers of an unjacketed segment of the plurality of second optical fibers extending beyond the second jacket with the at least one polymeric material to form a second optical fiber ribbon;
wherein the fusion splicing comprises mass fusion splicing between ends of optical fibers of the first optical fiber ribbon and ends of optical fibers of the second optical fiber ribbon, and the at least one splice joint comprises a plurality of splice joints.

8. The method according to claim 1, wherein:
the binding of the optical fibers of the unjacketed segment of the plurality of first optical fibers comprises contacting the plurality of first optical fibers with the at least one polymeric material in a flowable state and solidifying the at least one polymeric material to form the first optical fiber ribbon; and
the binding of the optical fibers of the unjacketed segment of the plurality of second optical fibers comprises contacting the plurality of second optical fibers with the at least one polymeric material in a flowable state and solidifying the at least one polymeric material to form the second optical fiber ribbon.

9. The method according to claim 1, wherein:
each optical fiber of the pluralities of first and second optical fibers comprises a stripped portion proximate to the plurality of splice joints and a pre-coated portion distal from the plurality of splice joints;
the plurality of first optical fibers, the plurality of second optical fibers, and the plurality of splice joints form a plurality of spliced optical fibers; and
the forming of the polymeric overcoating over the at least one splice joint comprises:
contacting the plurality of splice joints and at least part of the stripped portion of each optical fiber of the pluralities of first and second optical fibers with the at least one polymeric material in a flowable state;
altering position of at least some spliced optical fibers of the plurality of spliced optical fibers to yield a configuration in which the plurality of spliced optical fibers have a non-coplanar arrangement at the splice region; and
solidifying the at least one polymeric material to form a solidified polymeric material with the plurality of spliced optical fibers being in the non-coplanar arrangement at the splice region.

10. The method according to claim 1, wherein the at least one polymeric material in a flowable state comprises a molten polymeric material, and the solidifying of the at least one polymeric material comprises cooling the at least one polymeric material.

11. The method according to claim 1, further comprising applying a tubular covering member over the splice region, wherein the tubular covering member overlaps portions of the first jacket and the second jacket.

12. An apparatus for applying a thermoplastic coating over components of the fiber optic cable assembly in the method of claim 1, the apparatus comprising:
a support member defining a working surface;
a trough arranged above the working surface and defining a trough cavity configured to retain a pool of molten thermoplastic material, wherein the trough is bounded by a rear wall, a front wall, side walls, and the working surface, and wherein a lateral insertion slot extends (i) between the working surface and the front wall and (ii) between the working surface and at least portions of the side walls, with the lateral insertion slot being in fluid communication with the trough cavity; and
a heating element configured to heat at least the working surface to maintain the pool of molten thermoplastic material in a molten state.

13. The apparatus of claim 12, wherein the trough has a trough length extending in a longitudinal direction substantially parallel to the front wall and the rear wall, and has a trough width extending in a lateral direction substantially parallel to the side walls, with the trough length being greater than the trough width.

14. The apparatus according to claim 12, further comprising a support member having a longitudinal dimension, a lateral dimension, and left and right side surfaces, wherein:

the support member comprises a support member length extending in a longitudinal direction, and a support member width extending in a lateral direction;

the support member defines at least one longitudinal recess having a floor that is recessed relative to the working surface; and the at least one longitudinal recess extends over the entire support member length to penetrate the left and right side surfaces.

15. The apparatus according to claim 12, wherein the at least one longitudinal recess comprises a plurality of longitudinal recesses, and each longitudinal recess of the plurality of longitudinal recesses comprises a different width.

16. The apparatus according to claim 12, further comprising a body structure containing the heating element, wherein the body structure is configured to transfer heat from the heating element to the support member and the working surface by thermal conduction.

17. The apparatus according to claim 12, wherein the heating element comprises a resistive heating element.

* * * * *

UNITED STATES PATENT AND TRADEMARK OFFICE
CERTIFICATE OF CORRECTION

| | | |
|---|---|---|
| PATENT NO. | : 11,774,677 B2 | |
| APPLICATION NO. | : 17/747279 | |
| DATED | : October 3, 2023 | |
| INVENTOR(S) | : Qi Wu | |

It is certified that error appears in the above-identified patent and that said Letters Patent is hereby corrected as shown below:

On the Title Page

On the page 3, in Column 2, under "Other Publications", Line 29, delete "Usion" and insert -- Fusion --.

Signed and Sealed this
Fourteenth Day of May, 2024

Katherine Kelly Vidal
*Director of the United States Patent and Trademark Office*